United States Patent
Iwasa

(10) Patent No.: US 10,469,690 B2
(45) Date of Patent: Nov. 5, 2019

(54) INFORMATION PROCESSING APPARATUS

(71) Applicant: Keisuke Iwasa, Tokyo (JP)

(72) Inventor: Keisuke Iwasa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/815,073

(22) Filed: Nov. 16, 2017

(65) Prior Publication Data
US 2018/0152579 A1 May 31, 2018

(30) Foreign Application Priority Data

Nov. 30, 2016 (JP) .................................. 2016-233045
Aug. 28, 2017 (JP) .................................. 2017-163767

(51) Int. Cl.
| H04N 1/00 | (2006.01) |
| H04N 1/32 | (2006.01) |
| G06F 3/12 | (2006.01) |
| G06K 15/02 | (2006.01) |

(52) U.S. Cl.
CPC ..... *H04N 1/00891* (2013.01); *H04N 1/32641* (2013.01); *H04N 1/32667* (2013.01); *H04N 2201/006* (2013.01)

(58) Field of Classification Search
None
See application file for complete search history.

(56) References Cited

U.S. PATENT DOCUMENTS

| 5,345,437 A * | 9/1994 | Ogawa ...................... H04L 5/06 370/228 |
| 7,944,815 B2 * | 5/2011 | Thomson ............... H04L 12/437 370/222 |
| 8,675,501 B2 * | 3/2014 | Uchida .................... H04L 41/06 370/216 |
| 9,197,347 B2 * | 11/2015 | Nakashima ......... H04J 14/0204 |
| 2004/0133674 A1 | 7/2004 | Sasaki |
| 2004/0179221 A1* | 9/2004 | Endo .................. H04N 1/00278 358/1.13 |
| 2005/0179931 A1 | 8/2005 | Yamaguchi et al. |

(Continued)

FOREIGN PATENT DOCUMENTS

| JP | 2003-216558 | 7/2003 |
| JP | 2004-163891 | 6/2004 |

(Continued)

*Primary Examiner* — Beniyam Menberu
(74) *Attorney, Agent, or Firm* — Harness, Dickey & Pierce P.L.C.

(57) ABSTRACT

An information processing apparatus includes an interface and circuitry. The interface communicates with an auxiliary device via a first communication channel and a second communication channel. The first communication channel and the second communication channel are each separately exchange communications between the information processing apparatus and the auxiliary device. The circuitry obtains failure information indicating a communication failure occurring in the first communication channel, sends a shutdown instruction via the second communication channel in response to a determination to reboot the information processing apparatus, the shutdown instruction instructing the auxiliary device to shut down, and reboots the information processing apparatus.

20 Claims, 25 Drawing Sheets

(56) References Cited

U.S. PATENT DOCUMENTS

| | | | |
|---|---|---|---|
| 2008/0195897 A1* | 8/2008 | Alaniz | H04L 41/5064 714/46 |
| 2008/0232259 A1* | 9/2008 | Thomson | H04W 88/08 370/242 |
| 2010/0003016 A1* | 1/2010 | Ishimaru | H04N 5/232 386/224 |
| 2010/0017645 A1* | 1/2010 | Kimoto | H04N 5/232 714/4.1 |
| 2011/0099415 A1* | 4/2011 | Terauchi | H04L 12/2807 714/5.1 |
| 2013/0229672 A1* | 9/2013 | Naruse | H04N 1/00127 358/1.13 |
| 2014/0082747 A1 | 3/2014 | Negoro et al. | |
| 2014/0153043 A1 | 6/2014 | Iwasa et al. | |
| 2014/0226185 A1 | 8/2014 | Iwasa et al. | |
| 2014/0282490 A1 | 9/2014 | Shinomiya et al. | |
| 2014/0325199 A1 | 10/2014 | Iwasa et al. | |
| 2014/0365757 A1 | 12/2014 | Masuyama et al. | |
| 2015/0067375 A1 | 3/2015 | Iwasa | |
| 2015/0201341 A1* | 7/2015 | Nunokawa | H04W 24/08 455/67.13 |
| 2015/0210172 A1* | 7/2015 | Kanayama | B60L 11/1809 320/109 |
| 2015/0245229 A1* | 8/2015 | Gu | H04L 41/0668 455/419 |
| 2016/0150115 A1 | 5/2016 | Shibukawa et al. | |
| 2016/0274919 A1 | 9/2016 | Masuyama et al. | |
| 2017/0111537 A1 | 4/2017 | Iwasa et al. | |
| 2017/0132015 A1 | 5/2017 | Iwasa et al. | |
| 2017/0238350 A1* | 8/2017 | Tooyama | B60R 11/02 455/507 |
| 2017/0257505 A1 | 9/2017 | Iwasa | |
| 2018/0062815 A1* | 3/2018 | Mitchell | H04L 5/0055 |

FOREIGN PATENT DOCUMENTS

| | | |
|---|---|---|
| JP | 2005-229210 | 8/2005 |
| JP | 2009-055393 | 3/2009 |
| JP | 2011-070282 | 4/2011 |

\* cited by examiner

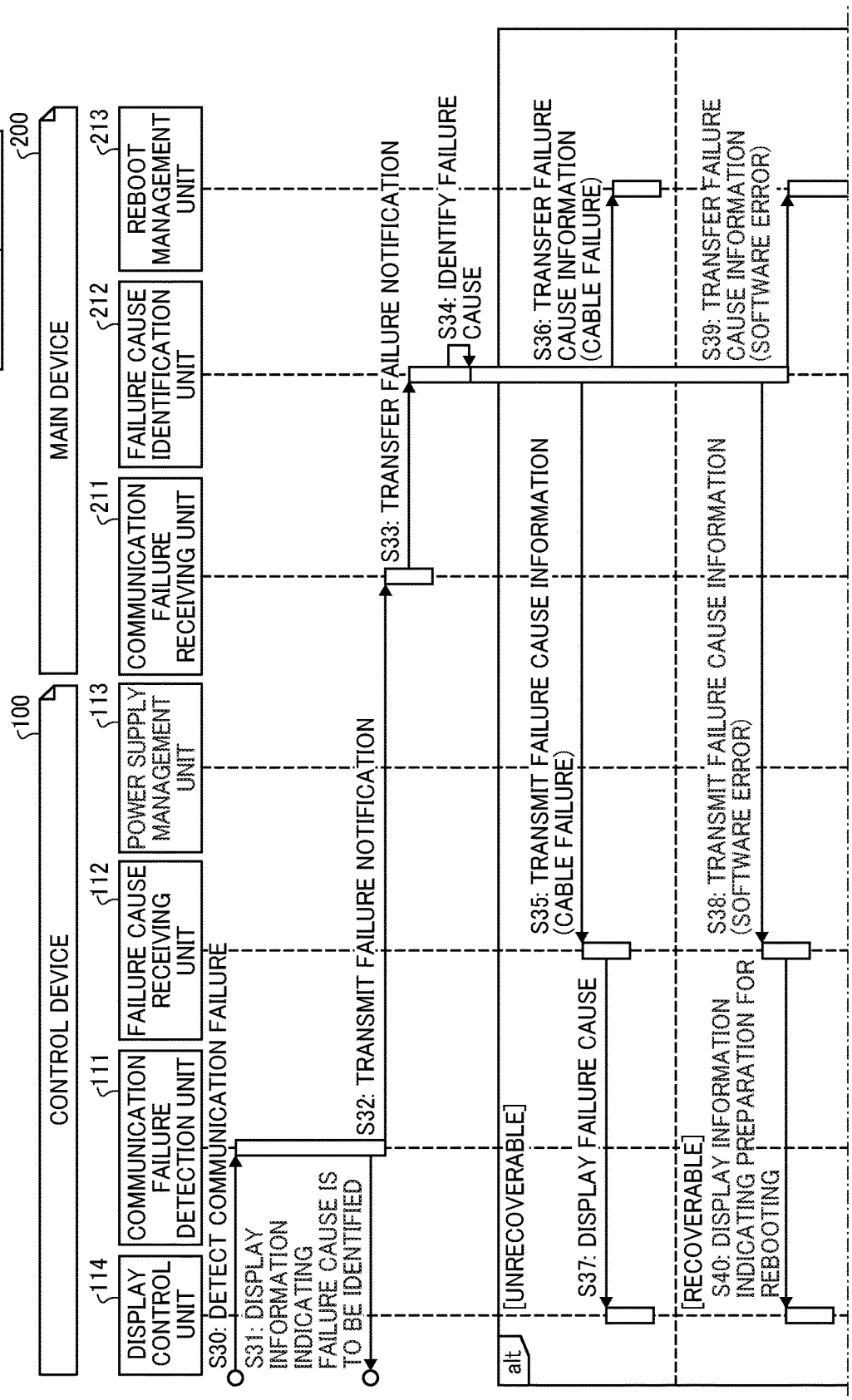

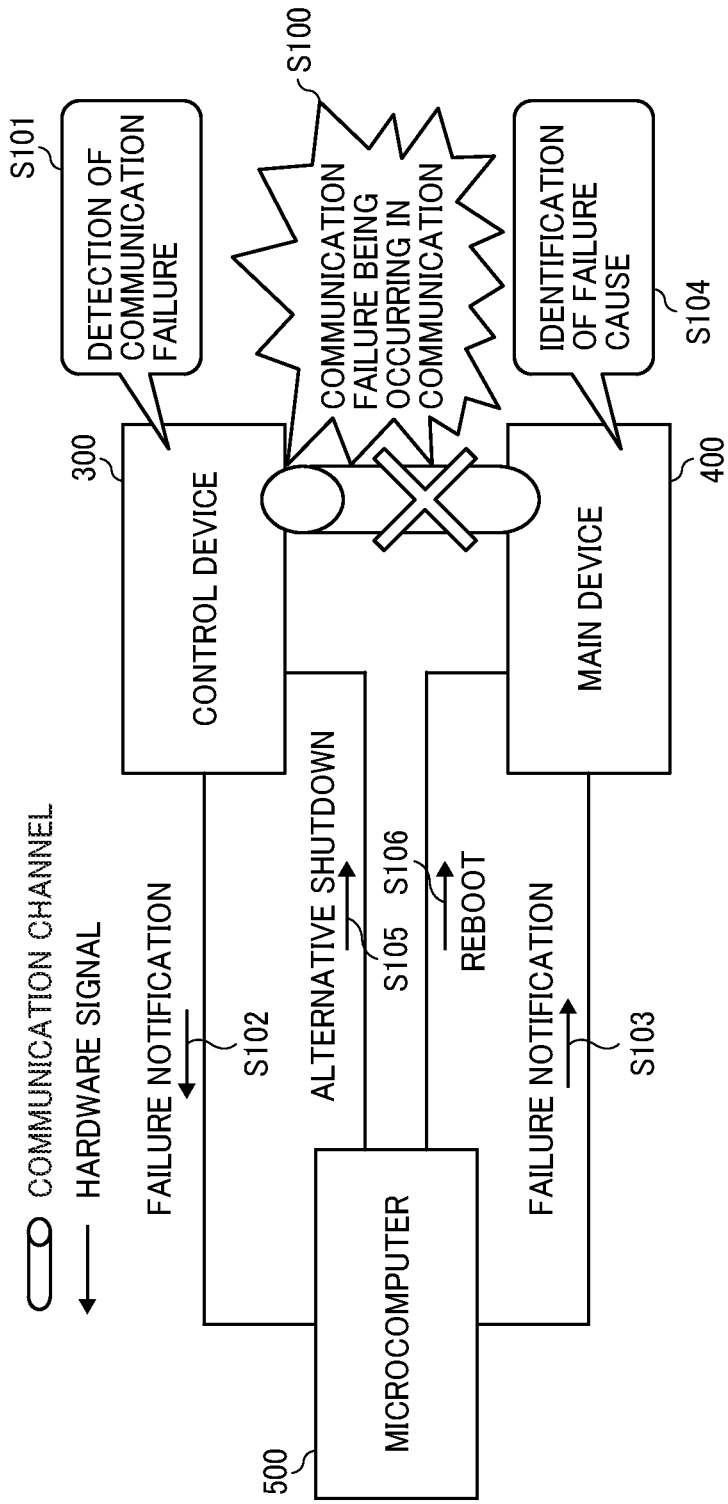

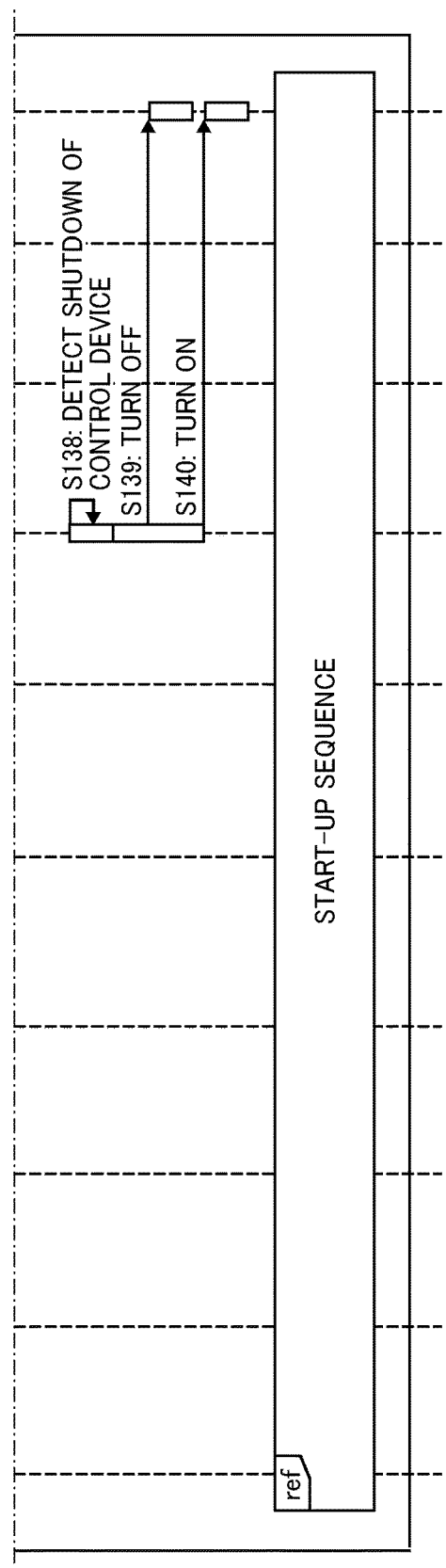

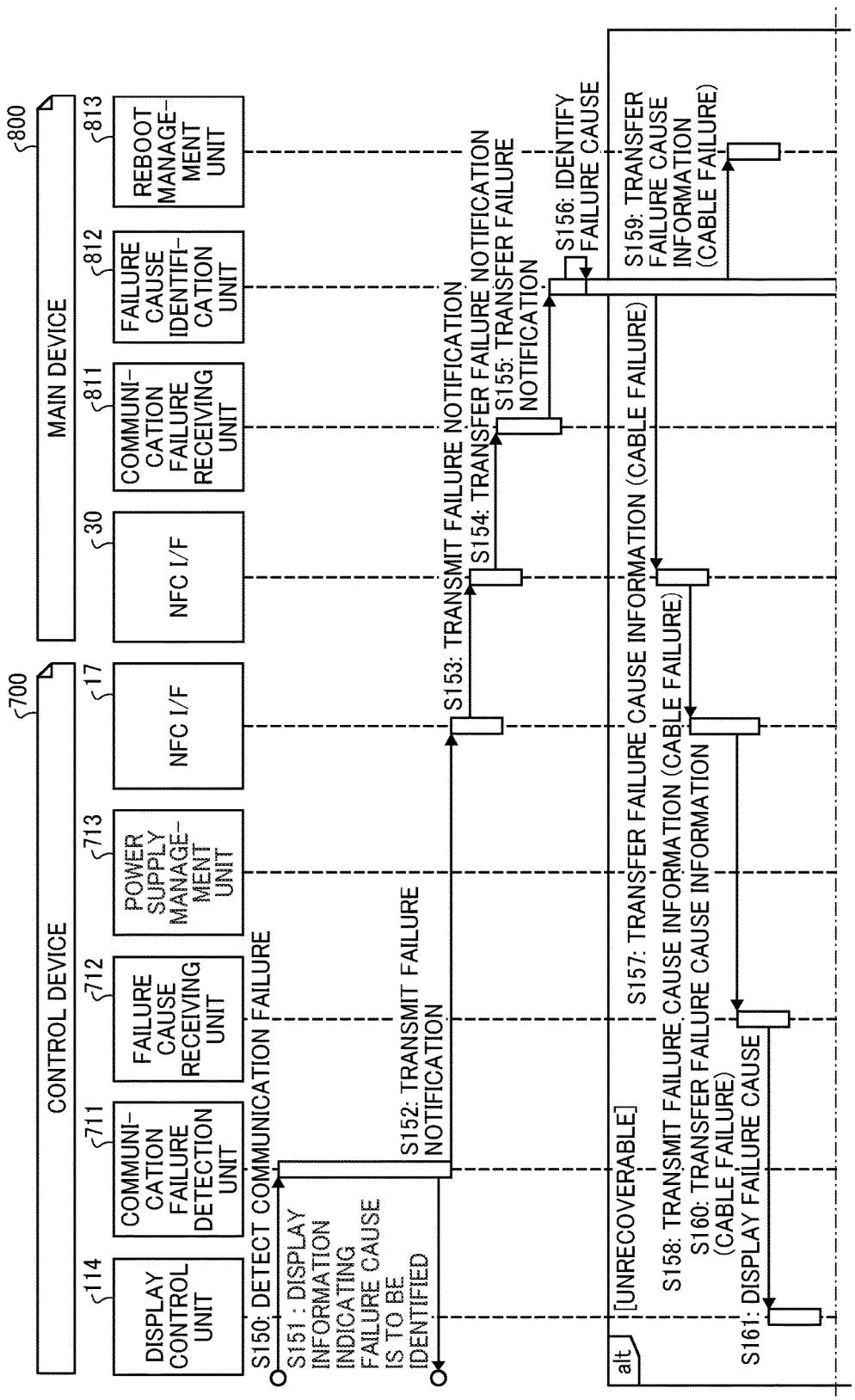

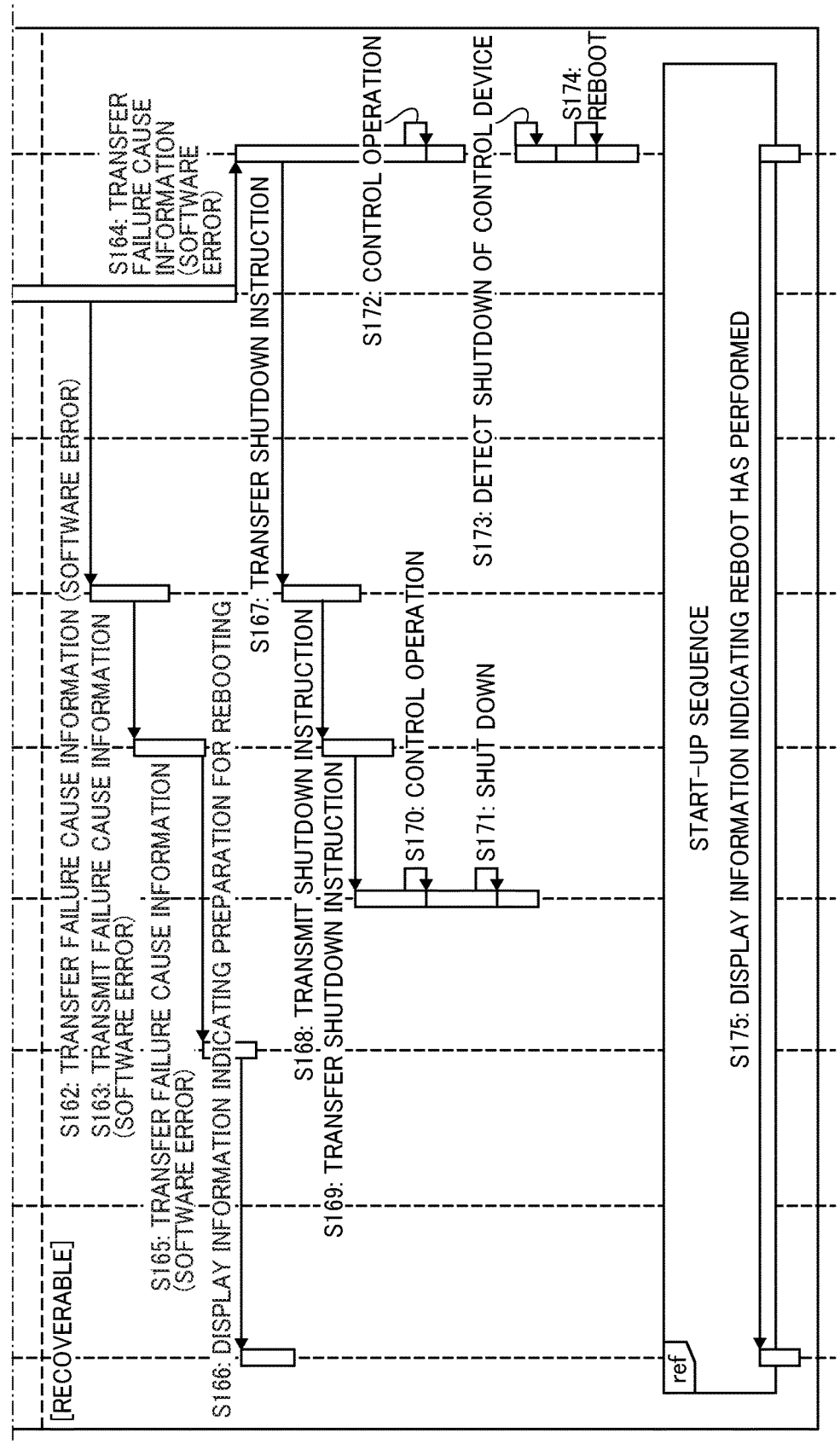

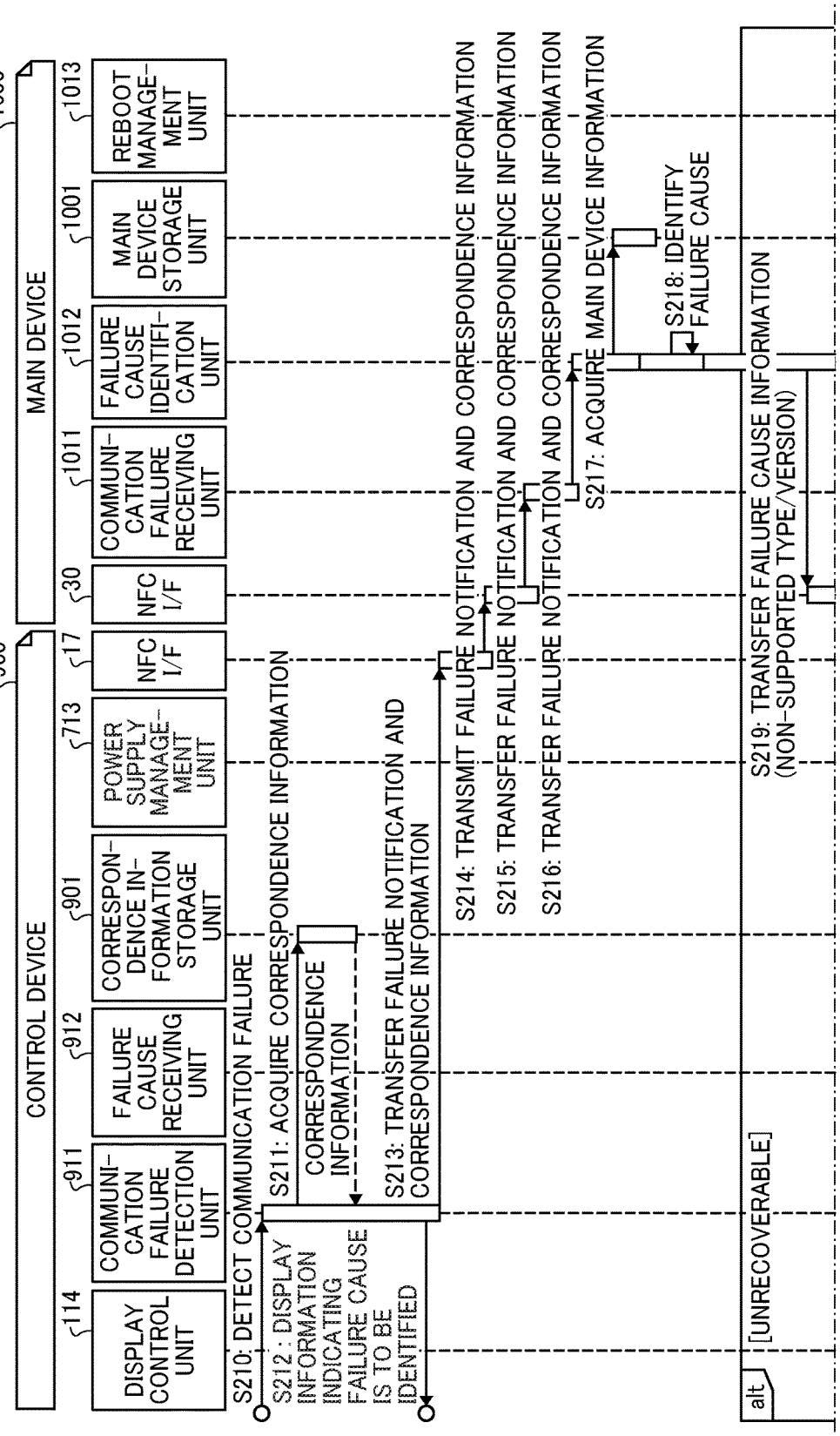

INFORMATION PROCESSING APPARATUS

CROSS-REFERENCE TO RELATED APPLICATION

This patent application is based on and claims priority pursuant to 35 U.S.C. § 119(a) to Japanese Patent Application Nos. 2016-233045, filed on Nov. 30, 2016, and 2017-163767, filed on Aug. 28, 2017, in the Japan Patent Office, the entire disclosures of which are hereby incorporated by reference herein.

BACKGROUND

Technical Field

The present discloser relates to an information processing apparatus.

Related Art

A known information processing apparatus, such as an image forming apparatus, includes a control device (operation device) and a main device (host device) each of which has an operating system (OS) and operates independently of each other. The control device, which operates independently of the main device, is able to respond quickly to a user operation even when the main device operates under a heavy load.

In such information processing apparatus having the control device and the main device that are independent of each other, if a communication failure occurs between the control device and the main device, recovery from such communication failure has been difficult.

SUMMARY

An information processing apparatus includes an interface and circuitry. The interface communicates with an auxiliary device via a first communication channel and a second communication channel. The first communication channel and the second communication channel are each separately exchange communications between the information processing apparatus and the auxiliary device. The circuitry obtains failure information indicating a communication failure occurring in the first communication channel, sends a shutdown instruction via the second communication channel in response to a determination to reboot the information processing apparatus, the shutdown instruction instructing the auxiliary device to shut down, and reboots the information processing apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 4A and 4B (FIG. 4) are a sequence diagram illustrating an operation flow of the image forming apparatus performing the reboot operation according to the first embodiment;

FIG. 9 is an illustration of a process flow in the information processing apparatus when a failure occurs in communication;

FIGS. 10A, 10B, and 10C (FIG. 10) are a sequence diagram illustrating operation of rebooting of the image forming apparatus according to the second embodiment;

FIGS. 13A and 13B (FIG. 13) are a sequence diagram illustrating operation of rebooting of the image forming apparatus according to the third embodiment;

FIGS. 16A and 16B (FIG. 16) are a sequence diagram illustrating operation of rebooting of the image forming apparatus;

Figure 1:
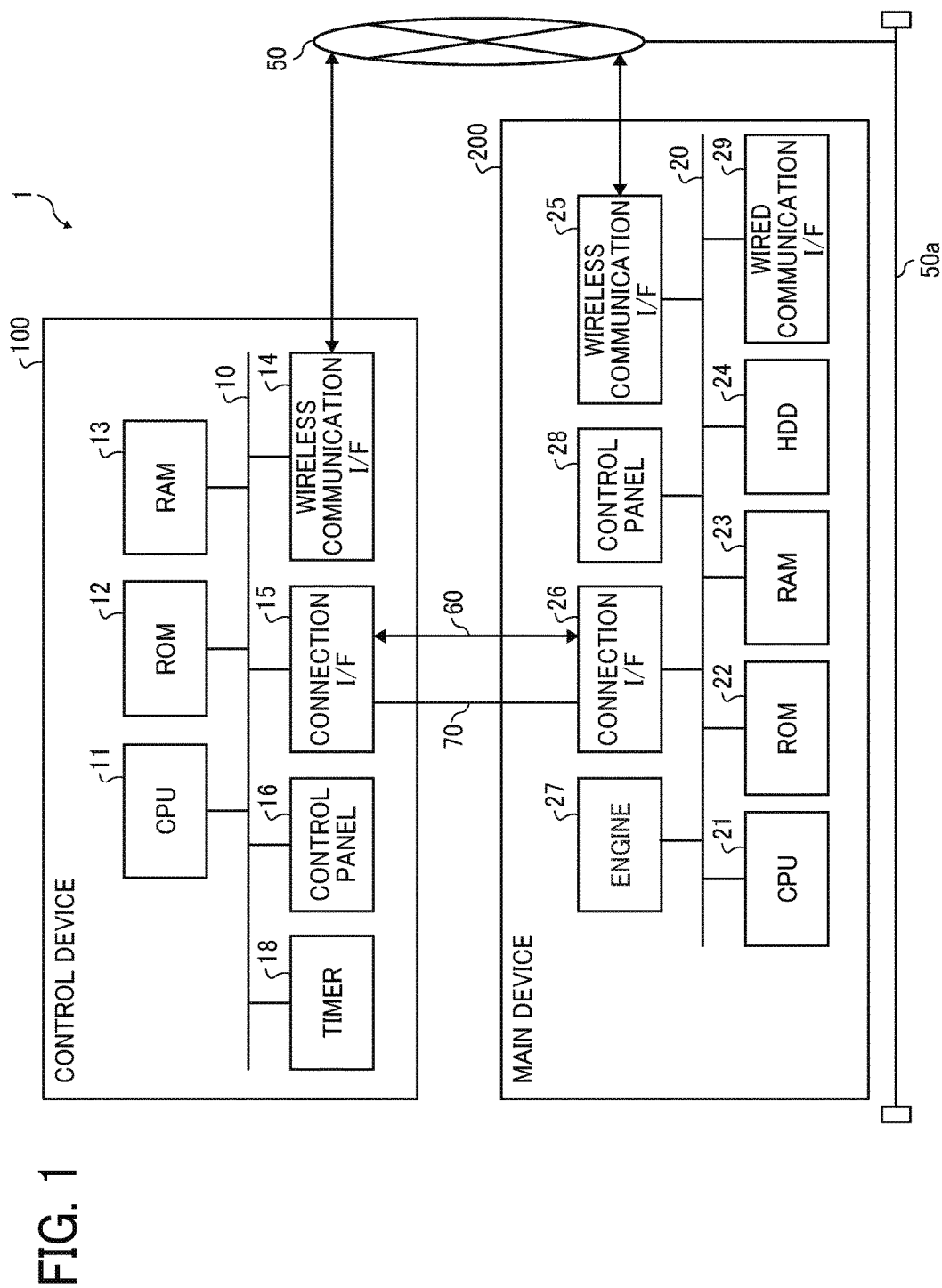
FIG. 1 is a block diagram illustrating a hardware configuration of an image forming apparatus according to a first embodiment.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Embodiments of an information processing apparatus and a recording medium storing a program of the present disclosure are described in detail with reference to the drawings. In the following description of some of the embodiments, an image forming apparatus is used as an example of the information processing apparatus, however, the embodiments are not limited to the image forming apparatuses, and alternatively other kinds of apparatus may be used. Examples of such an image forming apparatus are a multi function peripheral (MFP) having at least two of functions of scanning, faxing, and printing, a copier, a printer, and a scanner.

First Embodiment

FIG. 1 is a diagram illustrating an example of a hardware configuration of an image forming apparatus 1 according to a first embodiment. As illustrated in FIG. 1, the image forming apparatus 1 includes a control device 100, and a main device 200 that forms an image. The control device 100 is one example of an external device, or an auxiliary device, external to the main device 200, and the main device 200 is one example of an information processing apparatus.

The control device 100 and the main device 200 in the image forming apparatus 1 according to the embodiment described below are connected to each other using a signal line, or a wired line, for serial communication, however the embodiment is not limited to this and may alternatively use a wireless connection such as a wireless local area network (LAN). This does not mean to limit an interface for the connection, but the embodiment may use, instead of the signal line for the serial communication, a universal serial bus (USB), serial wired or wireless LAN Bluetooth (registered trademark), an infrared data association (IrDA), or a wireless fidelity (WiFi) (registered trademark), for example. Additionally, any desired communication system, for example, an inter-integrated circuit (I2C), may be used in the embodiment.

The control device 100 is a dedicated device that controls the main device according to an input of user operation. However, the embodiment is not limited to this and the control device 100 may be the general-purpose device such as a smartphone or a tablet, which belongs to a specific user. Each of the control device 100 and the main device 200 has an operating system (OS) and operates independently of the other.

The main device 200, capable of forming an image, operates as a host device operable with the control device 100. However, the host device, which is operable with the control device 100, is not limited to the main device 200 of the image forming apparatus 1 and alternatively any desired apparatus that is operable with the control device 100 may be used.

As illustrated in FIG. 1, the control device 100 includes a central processing unit (CPU) 11, a read only memory (ROM) 12, a random access memory (RAM) 13, a wireless communication interface (I/F) 14, a connection I/F 15, and a control panel 16. Additionally the control device 100 may include a timer 18. The above-mentioned components are connected to each other through an internal bus 10.

The CPU 11 controls overall operation of the control device 100. The CPU 11 executes a program stored in, for example, the ROM 12 using the RAM 13 as a work area, and thereby implementing various functions according to user operation.

The wireless communication I/F 14 is an interface for a wireless connection, and connects the control device 100 to a wireless communication network 50. The wireless communication network 50 is, for example, a wireless LAN.

The connection I/F 15, for example, is a wired interface for a wired connection, and communicates with the main device 200 through a first communication channel 60 and a second communication channel 70. As an example of each of the first communication channel 60 and the second communication channel 70, a cable for a USB connection may be used, however this is not limiting, and other connection technique may be used.

The first communication channel 60 transmits a software signal between the control device 100 and the main device 200 and is one example of a first communication channel. The control device 100 and the main device 200 in the image forming apparatus 1 usually communicate with each other with a software communication through the first communication channel 60. The software signal, here, is defined as a signal that uses a protocol. The software communication, here, is defined as communication with which the software signal is transmitted. The software communication includes Ether (Ethernet) communication and USB communication. Additionally, the first communication channel 60 may use a signal line or wireless communication to establish communication between the control device 100 and the main device 200.

The second communication channel 70 transmits a hardware signal between the control device 100 and the main device 200 and is one example of a second communication channel. The second communication channel 70 is used for hardware communication established between the control device 100 and the main device 200 when a communication failure occurs due to the failure in software communication with the first communication channel 60. More specifically, the second communication channel 70 is used to report detection of such a communication failure from the control device 100 to the main device 200 with a hardware signal, and also used to transmit, from the main device 200 to the control device 100, an instruction to turn off the control device 100 with the hardware signal. The hardware signal, here, is defined as a signal that uses a voltage level, High/Low, but not a protocol, and is used to report a state of a device. The hardware communication, here, is defined as communication with which the hardware signal is transmitted. The hardware communication includes, for example, general-purpose input/output (GPIO) communication. However, a communication method applied to the second communication channel 70 is not limited to the communication method described above. The second communication channel 70 may use any communication method as long as communication is established independently of the first communication channel 60. In another example, the second communication channel 70 may be a communication channel that transmits a software signal. Alternatively, the second communication channel 70 may be configured with multiple lines, and the multiple lines may be a combination of a type of signal line that transmits a hardware signal and another type of signal line that transmits a software signal. The second communication channel 70 may also use a signal line or wireless communication for the communication between the control device 100 and the main device 200.

The control panel 16 includes a touch screen and a hardware key. Examples of the touch screen include a liquid crystal display (LCD) and an electro luminescence (EL) display device, each of which implements a touch panel function. The control panel 16 is one example of a display.

Additionally, an input device to receive a user input may be provided separately from a display to display information to the user. As the input device, for example, any one or more of a keyboard, a mouse, a microphone to receive an audio input and a camera to receive a video image may be provided. The control panel 16 may further be provided with a speaker used to notify the user of a state of the device.

As illustrated in FIG. 1, the main device 200 includes a CPU 21, a ROM 22, a RAM 23, a hard disk drive (HDD) 24, a wireless communication I/F 25, a connection I/F 26, an engine 27, a control panel 28, and a wired communication I/F 29. The above-mentioned components are connected to each other through an internal bus 20.

The CPU 21 controls overall operation of the main device 200. The CPU 21 executes a program stored in, for example, the ROM 22 or the HDD 24 using the RAM 23 as a work area. The CPU 21, accordingly, implements various functions such as copying, scanning, faxing, printing and other functions described later. Additionally, the CPU 21, the ROM 22, and the RAM 23 may be a plurality of CPUs, ROMs, and RAMs, and share to implement the various functions.

The wireless communication I/F 25 is an interface for a wireless connection, and connects the main device 200 to the wireless communication network 50.

The connection I/F 26 is, for example, an interface for a wired connection, and communicates with the control device 100 using the first communication channel 60 and the second communication channel 70.

The engine 27 implements various functions according to a type of an information processing apparatus. In the information processing apparatus in this example, namely in the image forming apparatus 1, the engine 27 is, for example, an image forming engine, and implements a function of a monochrome plotter, a drum color plotter, a scanner, and/or a facsimile communication device. The control panel 28 includes a touch screen and a hardware key. The control panel 28 may be a display to display a screen.

The wired communication I/F 29 is a wired interface used for a wired connection, and connects to a LAN 50*a*. The wired communication I/F 29 is, for example, a wired network communication circuit.

Figure 2:
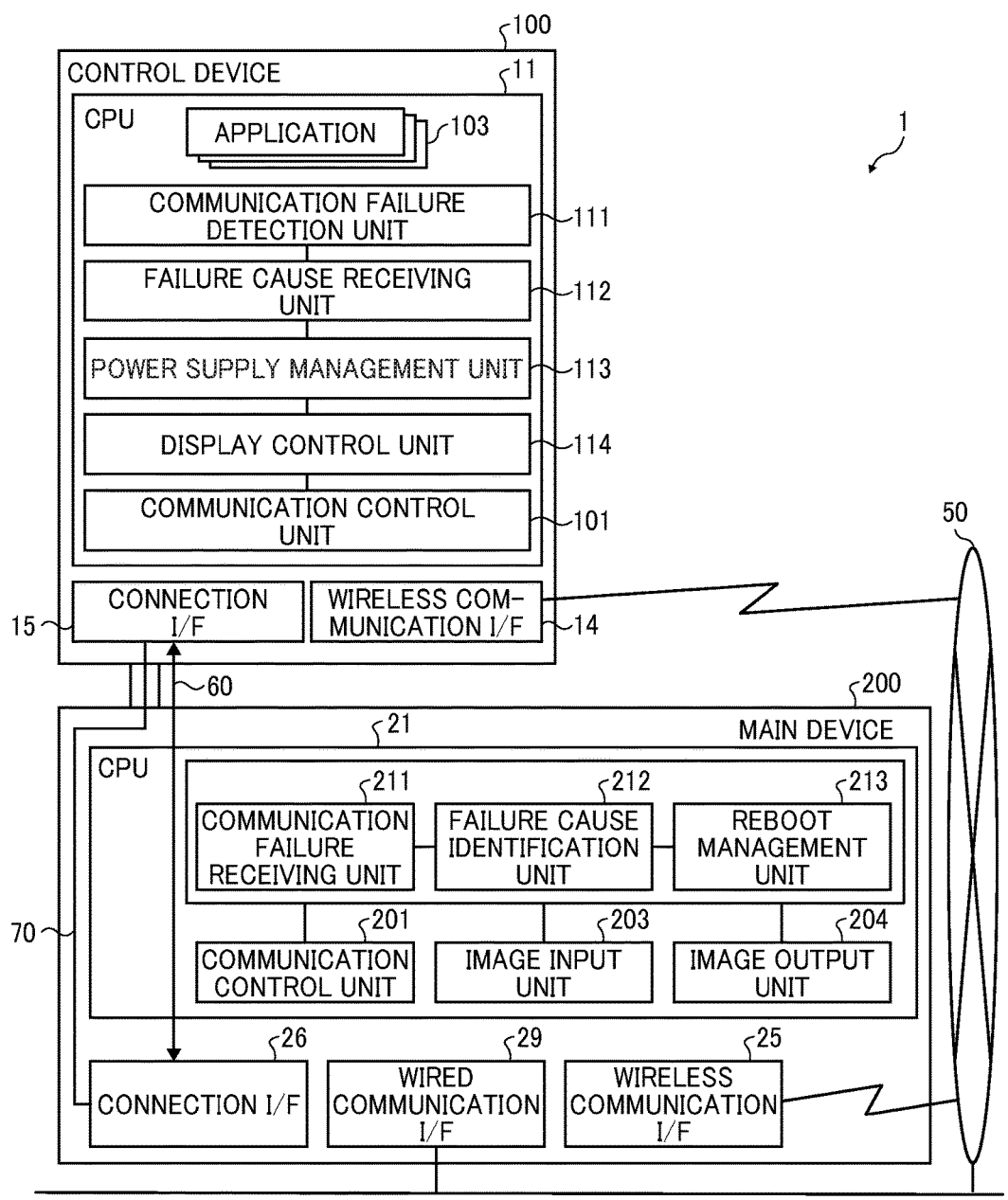
FIG. 2 is a block diagram illustrating a functional configuration of the image forming apparatus according to the first embodiment.

FIG. 2 is a block diagram illustrating a functional configuration of the image forming apparatus 1 according to the first embodiment. By executing the program read from the ROM 12 onto the RAM 13 with the CPU 11, the control device 100 of FIG. 2 implements a communication control unit 101, a communication failure detection unit 111, a failure cause receiving unit 112, a power supply management unit 113, and a display control unit 114. The CPU 11 also executes an application 103 stored in any desired memory. Alternatively, each functional unit may be implemented with a plurality of hardware devices including a plurality of CPUs and memories such as ROMs and RAMs, by operating in conjunction with each other.

The communication control unit 101 sends to and receives from other devices, including the main device 200, information via the connection I/F 15 or the wireless communication I/F 14.

The application 103 has a user interface used to display a screen on the control panel 16 and receive settings for operation from a user via the control panel 16. The application 103 may further provide a service using one or more of the various functions of the main device 200, such as copying, scanning, faxing and printing. In this example, any number of application programs 103 may be provided and at least one of the plurality of application programs 103 may use the control panel 16, the main device 200, or both of the main device 200 and the control panel 16.

The communication failure detection unit 111 detects a communication failure that occurs in the first communication channel 60, which uses the software communication between the control device 100 and the main device 200. For example, the communication failure detection unit 111 determines that the communication failure occurs, when the communication control unit 101 has not received a signal for a predetermined time since the last time a signal was received, or when a predetermined time has passed without receiving a signal since the communication control unit 101 sent a predetermined signal to the main device 200. Here, the predetermined time and the predetermined signal are, for example, determined according to a standard of the second communication channel 70 or set by a designer according to, for example, the empirical data or preferences. However, the methods for detecting the communication failure are not limited to the method mentioned above.

When detecting the communication failure in the first communication channel 60, the communication failure detection unit 111 sends a notification of failure (failure information) indicating that the communication failure occurs in the first communication channel 60 to the main device 200 with a hardware signal through the second communication channel 70. Hereinafter, this notification may be referred to as a failure notification or failure information.

After the failure notification indicating the communication failure in the first communication channel 60 is received by the main device 200, the failure cause receiving unit 112 receives, from the main device 200 through the second communication channel 70, information indicating a cause of the communication failure (hereinafter, this may be referred to as failure cause information) or information indicating a determination result that indicates whether or not to reboot the main device 200 (hereinafter, this may be referred to as a determination result).

The power supply management unit 113 manages power supply of the control device 100. The power supply management unit 113 also receives, from the main device 200 through the second communication channel 70, an instruction to shut down (hereinafter, this may be referred to as a shutdown instruction) when a cause of the communication failure occurring in the first communication channel 60 corresponds to a predetermined cause that is able to be solved to recover the image forming apparatus 1 from the communication failure by rebooting or when the determination result indicates to reboot the main device 200. When receiving the shutdown instruction, the power supply management unit 113 shuts down the control device 100. At this time, the power supply management unit 113 may stop all programs operating in the control device 100 to completely turn off the power source, or may save a current operational state and remain the power supply to some of the components in the control device 100 so that the control device 100 starts at high speed next time. Additionally, the main device 200 may use a signal line that transmits a software signal of the multiple signal lines being configured as the second communication channel 70 when sending the shutdown instruction to the control device 100. The predetermined cause mentioned above is a cause of a failure that occurs in the first communication channel 60 and is possibly solved to recover the image forming apparatus 1 by rebooting the image forming apparatus 1, and such a predetermined cause includes, for example, a software error.

The display control unit 114 displays various kinds of information on the control panel (display) 16 for the user. In this embodiment, the display control unit 114 displays, on the control panel 16, a failure cause of the communication failure occurring in the first communication channel 60 or whether or not to reboot the main device 200, according to, respectively, the failure cause information or the determination result, received from the main device 200. The display control unit 114 also displays on the control panel 16 information indicating that the image forming apparatus 1 is preparing for rebooting when the failure cause is the predetermined cause, for example, a software error, which is possible to be corrected to recover the image forming apparatus 1 by rebooting. The display control unit 114 further displays, on the control panel 16, information indicating that the image forming apparatus 1 has rebooted after a reboot process of the image forming apparatus 1 has been completed.

A functional configuration of the main device 200 is described below. Referring to FIG. 2, the main device 200 includes a communication control unit 201, an image input unit 203, an image output unit 204, a communication failure receiving unit 211, a failure cause identification unit 212, and a reboot management unit 213. The functional units mentioned above of the main device 200 are implemented by executing the program read from the ROM onto the RAM 23 with the CPU 21. Alternatively, the functional units may be implemented with a plurality of hardware devices including a plurality of CPUs and memories such as ROMs and RAMs, by operating in conjunction with each other.

The communication control unit 201 sends to and receives from other devices, including the control device 100, information via the connection I/F 26, the wireless I/F 25, and the wired communication I/F 29.

The image input unit 203 receives image data input to the main device 200. The image output unit 204 outputs image data from the main device 200 and prints an image. The image input unit 203 and the image output unit 204 are implemented with the engine 27.

When the control device 100 detects a communication failure in the first communication channel 60, the communication failure receiving unit 211 receives the failure notification sent from the control device 100 with the hardware signal through the second communication channel 70. Additionally, the communication failure receiving unit 211 may detect the communication failure in the first communication channel 60. In this case, in which the communication failure receiving unit 211 detects the communication failure, the communication failure receiving unit 211 determines that the communication failure occurs, for example, when the communication control unit 201 has not received a signal for the predetermined time since the last time a signal was received, or when the predetermined time has passed without receiving a signal since the communication control unit 201 sent a predetermined signal to the control device 100. However, the methods for detecting the communication failure are not limited to the method mentioned above.

The failure cause identification unit 212 determines and identifies the cause of the communication failure occurring in the first communication channel 60 when receiving the failure notification from the control device 100 or when the communication failure receiving unit 211 detects the communication failure in the first communication channel 60. Here in the embodiment, as examples of the cause of the communication failure in the first communication channel 60, a hardware error, a cable failure, and a software error are described. When the failure cause is a hardware error or a cable failure, the failure cause identification unit 212 determines not to reboot the image forming apparatus 1 because the hardware error and the cable failure are not able to be corrected by rebooting the image forming apparatus 1. On the other hand, when the failure cause is a software error, the failure cause identification unit 212 determines to reboot the image forming apparatus 1 because the communication failure can be corrected by rebooting the image forming apparatus 1. That is, the failure cause identification unit 212 determines whether the image forming apparatus 1 is recoverable or not and whether not to reboot the main device 200 according to the failure cause.

The following describes example methods for identifying a cause of the communication failure, which occurs in the first communication channel 60. For example, the failure cause identification unit 212 checks whether there is a defect in a non-volatile area that stores a basic input/output system (BIOS). When the BIOS starts up normally, a light emitting diode (LED) of the main device 200 flashes. The failure cause identification unit 212 checks a state of the LED, namely if the LED is flashing to determine whether the non-volatile has a defect. When the LED is not flashing, the failure cause identification unit 212 determines that the failure cause is a defect of the non-volatile area and identifies the hardware error as the failure cause.

Additionally or alternatively, for example, the failure cause identification unit 212 checks a state of the connection I/F 26 that is a USB port (current connect state), and determines whether there is a connection device connected to. When there is no connection device being connected to, the failure cause identification unit 212 identifies the cable failure as the failure cause. That is, the failure cause identification unit 212 identifies the cable failure as the failure cause if detecting an abnormal situation in the connection state such that a cable is disconnected from the connection I/F 26, the cable is broken, or cut.

Additionally, for example, the failure cause identification unit 212 identifies the software error as the failure cause when determining the failure cause is not a hardware-related failure cause, for example, the hardware error and the cable failure. Such settings is set by a designer in designing the system, the service provider providing the services, etc. Alternatively, the user may set or modify such settings.

The failure cause identification unit 212 sends the failure cause information indicating the identified failure cause, which causes the communication failure in the first communication channel 60, to the control device 100 using the second communication channel 70. Alternatively, the failure cause identification unit 212 may send a determination result indicating whether or not to reboot the main device 200, instead of the failure cause information, to the control device 100 through the second communication channel 70.

The reboot management unit 213 sends, to the control device 100, the shutdown instruction with the hardware signal through the second communication channel 70 when the failure cause is the software error (one example of the predetermined cause). Subsequently, the reboot management unit 213 controls the main device 200 and reboots the main device 200 when detecting shutdown of the control device 100. That is, when the failure cause identification unit 212 determines to reboot the main device 200, the reboot management unit 213 sends the shutdown instruction to the control device 100 through the second communication channel 70, and then reboots the main device 200. At this time, the reboot management unit 213 may restart after deactivating all programs being activated in the main device 200 and stopping the power supply to all components in the main device 200. Alternatively, the reboot management unit 213 may reboot while remaining the power supply to some of the components in the main device 200, or may reboot after deactivating a part or all of the software being activated in the main device 200.

Figure 3:
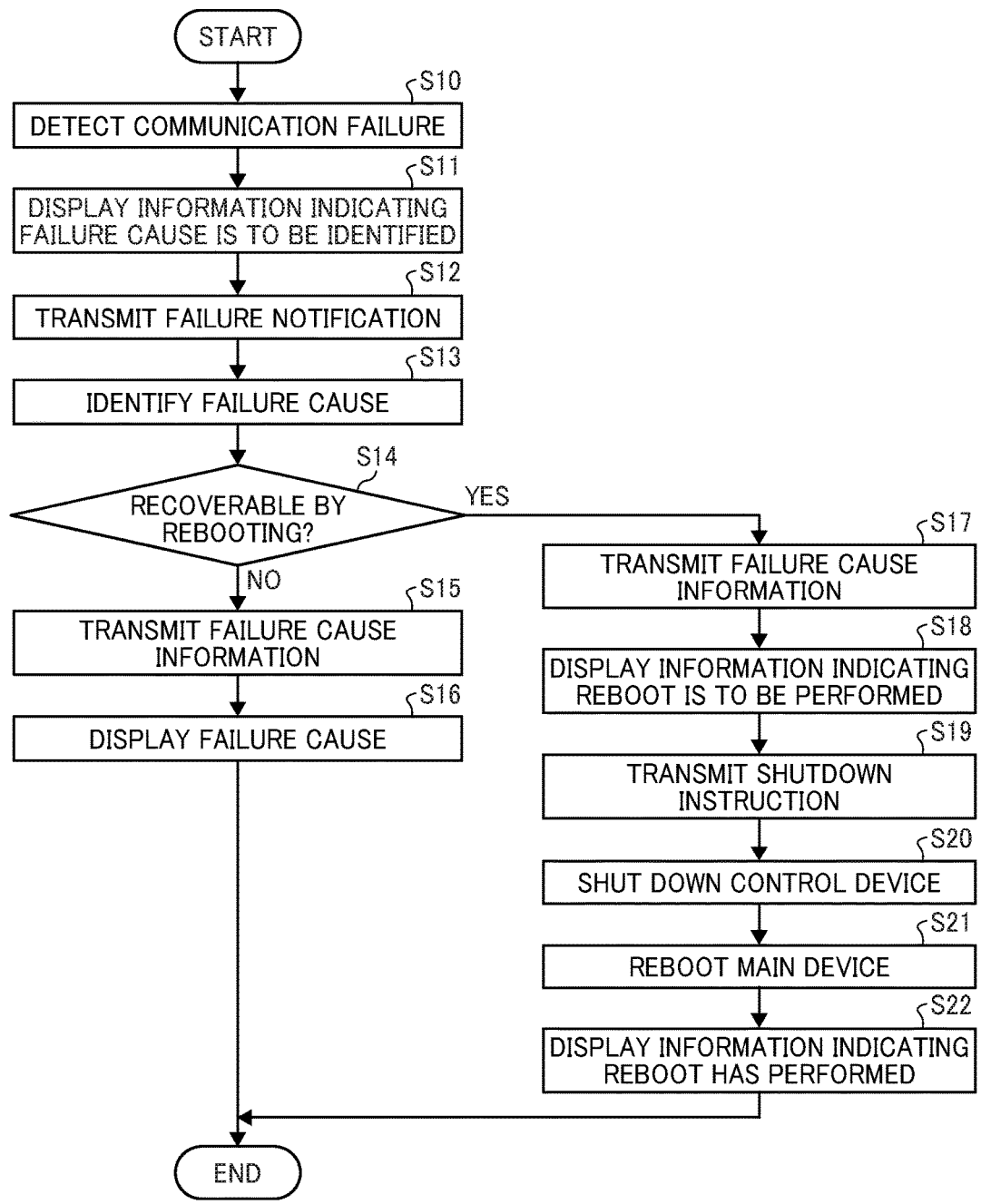
FIG. 3 is a flowchart illustrating reboot operation of the image forming apparatus according to the first embodiment.

Reboot operation of the image forming apparatus 1 according to the embodiment is described below. FIG. 3 is a flowchart illustrating the reboot operation of the image forming apparatus 1 according to the first embodiment. The operation of FIG. 3 is performed by the control device 100 and the main device 200 that cooperate with each other.

The control device 100 detects a communication failure in the first communication channel 60 (S10). Subsequently, the control device 100 displays, on the control panel 16, information indicating that a cause of the communication failure, or a failure cause, which is detected, is to be identified (S11). The control device 100 sends a failure notification indicating that the communication failure being occurring in the first communication channel 60 to the main device 200 through the second communication channel 70 (S12).

When receiving the failure notification, the main device 200 determines and identifies a failure cause of the communication failure (S13). The main device 200, then, determines whether the image forming apparatus 1 is able to recover from the communication failure by rebooting according to the identified failure cause, namely determines whether or not to reboot the main device 100 (S14).

When determining that the image forming apparatus 1 is not able to recover from the communication failure by rebooting (S14: NO), the main device 200 sends, to the control device 100 through the second communication channel 70, the failure cause information indicating the identified failure cause and the determination result indicating that the image forming apparatus 1 is not recoverable from the communication failure by rebooting (S15).

When receiving the failure cause information from the main device 200, the control device 100 displays on the control panel 16 the failure cause and information indicating that the communication failure is not able to be solved by rebooting, and the process is completed (S16). In this case, the failure cause of the communication failure is, for example, a hardware error or a cable failure.

On the other hand, when determining that the image forming apparatus 1 is able to recover from the communication failure by rebooting (S14: YES), the main device 200 sends, to the control device 100 through the second communication channel 70, the failure cause information indicating the identified failure cause and the determination result indicating that the image forming apparatus 1 is recoverable from the communication failure by rebooting, namely to reboot the main device 200 (S17). Alternatively, the main device 200 may send the determination result that indicates to reboot the main device 200 without sending the failure cause information to the control device 100 through the second communication channel 70. When receiving the failure cause information and the determination result, which indicates the image forming apparatus 1 is able to recover from the communication failure by rebooting, the control device 100 displays information indicating that the image forming apparatus 1 is preparing for rebooting on the control panel 16 (S18).

The main device 200 sends to the control device 100 an instruction to shut down the control device 100 (S19), and the control device 100 shuts down in response to the instruction (S20). After the control device 100 shuts down, the main device 200 starts rebooting (S21).

When the main device 200 sends to the control device 100 through the first communication channel 60 a notification indicating that the main device 200 has rebooted, which may be, hereinafter, referred to as a reboot completion notification, and then the control device 100 displays information indicating the image forming apparatus 1 has rebooted (S22). This allows the main device 200 and the control device 100 to communicate to each other through the first communication channel 60, and the image forming apparatus 1 operates normally. In the embodiment, the main device 200 starts rebooting after the control device 100 shuts down, however the embodiment is not limited this and alternatively the main device 200 may reboot at substantially the same time as the control device 100 shuts down or the main device 200 may reboot before the control device 100 shuts down.

Figure 4B:
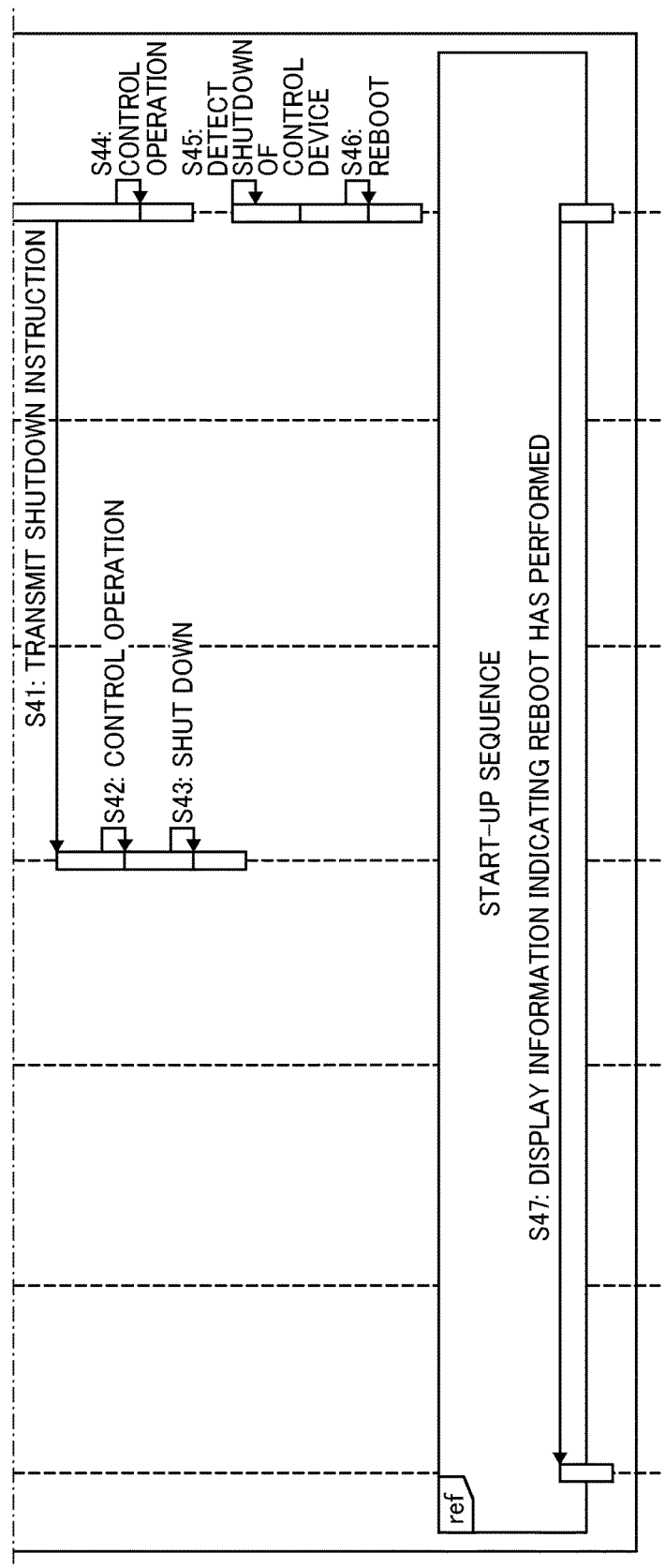

A detailed description of the reboot operation of the image forming apparatus 1 according to the embodiment is given below with reference to FIG. 4. FIGS. 4A and 4B (FIG. 4) are a sequence diagram illustrating an operation flow of the image forming apparatus 1 performing the reboot operation. In FIG. 4 (FIGS. 4A and 4B), the control device 100 and the main device 200 communicate to each other via the communication control unit 101 and the communication control unit 201 (see FIG. 2).

The communication failure detection unit 111 of the control device 100 detects a communication failure in the first communication channel 60 (S30), and the display control unit 114 causes the control panel 16 to display information indicating that a cause of the communication failure being occurring in the first communication channel 60 is to be identified (S31).

The communication failure detection unit 111, then, transmits to the main device 200 a failure notification indicating that the communication failure being occurring in the first communication channel 60 with a hardware signal through the second communication channel 70 (S32).

The communication failure receiving unit 211 of the main device 200 receives the failure notification from the control device 100 and transfers the failure notification to the failure cause identification unit 212 (S33). The failure cause identification unit 212 determines and identifies the cause of the communication failure occurring in the first communication channel 60 (for example, a hardware error, a cable failure, or a software error) in response to reception of the failure notification (S34).

A case where the image forming apparatus 1 is not able to recover from the communication failure occurring in the first communication channel 60 by rebooting, namely an unrecoverable case, is described below. When the failure cause is, for example, a cable failure, the failure cause identification unit 212 transmits to the control device 100 with the hardware signal through the second communication channel 70, failure cause information indicating that the failure cause is the cable failure and the image forming apparatus 1 is not able to recover from the communication failure by rebooting (S35). The failure cause identification unit 212 also transfers the failure cause information to the reboot management unit 213 (S36).

When the failure cause receiving unit 112 of the control device 100 receives from the main device 200 the failure cause information indicating the failure cause and that the image forming apparatus 1 is not able to recover from the communication failure by rebooting, the display control unit 114 of the control device 100 causes the control panel 16 to display contents corresponding to the failure cause information (S37) to inform a user the contents thereof. More specifically, for example, the control panel may display, for example, "The cable is disconnected. Rebooting the apparatus is not able to solve this error. Please contact with a service center", and this may help the user to deal with the situation smoothly. Then, the image forming apparatus 1 completes the process without rebooting with the reboot management unit 213 of the main device 200.

On the other hand, another case where the image forming apparatus 1 is able to recover from the communication failure occurring in the first communication channel 60 by rebooting, namely a recoverable case, is described next. When the failure cause is, for example, a software error, which is able to be corrected by rebooting, the failure cause identification unit 212 transmits to the control device 100 with the hardware signal through the second communication channel 70, the failure cause information indicating that the failure cause is the software error that is possibly be corrected by rebooting to recover the image forming apparatus 1 (S38). The failure cause identification unit 212 also transfers the failure cause information to the reboot management unit 213 (S39).

When the failure cause receiving unit 112 of the control device 100 receives the failure cause information, which indicates the image forming apparatus 1 is recoverable, from the main device 200, the display control unit 114 of the control device 100 causes the control panel 16 to display information indicating that the image forming apparatus 1 is preparing for rebooting (S40) to inform the user thereof.

Subsequently, referring to FIG. 4B, the reboot management unit 213 of the main device 200 transmits to the control device 100 a shutdown instruction with the hardware signal through the second communication channel 70 (S41). The power supply management unit 113, which receives the shutdown instruction, controls the control device 100 (S42), and shuts down the control device 100 (S43).

The reboot management unit 213 controls current operation performed by the main device 200 for preparation for reboot (S44). When the reboot management unit 213 detects the shutdown of the control device 100 (S45), the reboot management unit 213 reboots the main device 200 (S46).

After the image forming apparatus 1 reboots, or restarts, the main device 200 and the control device 100 communicate normally to each other, resulting in establishment normal software communication through the first communication channel 60. The reboot management unit 213, accordingly, sends to the control device 100 a reboot completion notification indicating that the image forming apparatus 1 completes rebooting, with the software signal through the first communication channel 60, and the display control unit 114 causes the control panel 16 to display that the image forming apparatus 1 has rebooted (S47). After that, the image forming apparatus 1 is able to perform various processing, such as image forming.

As described above, in the image forming apparatus 1 according to the first embodiment, when the communication failure occurs in the first communication channel 60 that uses the software communication with a software signal between the control device 100 and the main device 200, the failure notification, which indicates the communication failure in the first communication channel 60, is transmitted from the control device 100 to the main device 200 through the second communication channel 70 with the hardware signal. The main device 200 then identifies the failure cause and sends the failure cause information to the control device 100 through the second communication channel 70. When the failure cause indicates that the image forming apparatus 1 is recoverable from the communication failure by rebooting, the main device 200 causes the control device 100 to shut down and reboots. As described above, the image forming apparatus 1 in which the main device 200 and the control device 100 are provided independently of each other is able to recover from such an abnormal state where the communication failure occurs between the main device 200 and the control device 100.

Modification of First Embodiment

The image forming apparatus 1 according to the first embodiment shuts down the control device 100 and reboots the main device 200 when the communication failure occurring in the first communication channel 60 is caused by the predetermined cause such as a software error, which is correctable by rebooting. On the other hand, an image forming apparatus according to a modification of the first embodiment (first modified embodiment) shuts down a control device and reboots a main device when a predetermined condition is met, in addition to that a communication failure in a communication channel is caused by the predetermined cause such as a software error.

This is because, for example, there is a case where the image forming apparatus 1 is not able to recover from a communication failure by rebooting even when a failure cause is to be correctable by rebooting. Rebooting the image forming apparatus 1 in such a case by following a determination result determined based on the failure cause in such a case may cause the image forming apparatus 1 to reboot continuously, resulting in causing the user to feel discomfort. To cope with this situation, another condition to reboot is added when a communication failure occurs. For example, the image forming apparatus 1 according to the first modified embodiment reboots when a predetermined time period has passed since the last reboot in addition to the predetermined failure cause. Here, the predetermined time period may be desirably set by a designer. Additionally, a user may set the predetermined time period.

A hardware configuration of the image forming apparatus 1 according to the first modified embodiment is the same as that of the first embodiment (see FIG. 1). A functional configuration of the image forming apparatus 1 according to the first modified embodiment is similar to that of the first embodiment, except for some differences. The differences include addition of one or more functions, which will be described below with reference to FIG. 2.

A power supply management unit 113 of the control device 100 according to the first modified embodiment causes the timer 18, which may alternatively be implemented by software, to start measuring a time when the failure cause receiving unit 112 receives the failure cause information. This is an additional function to the power supply management unit 113 according to the first embodiment. Additionally, the time measuring function may be implemented as software, such as a program, instead of hardware such as the timer 18. The power supply management unit 113 that receives the failure cause information indicating that the failure cause is the predetermined cause, which is correctable, such as a software error, controls not to shut down the control device 100 unless a shutdown instruction is received by the control device 100, for a first predetermined time, for example, one minute after the reception of the failure cause information. The first predetermined time is, for example, set by designer.

A display control unit 114 of the control device 100 according to the first modified embodiment displays, on the control panel 16, information indicating that the image forming apparatus 1 is preparing for rebooting, when receiving the failure cause information indicating that the image forming apparatus 1 is recoverable from the communication failure occurring in the first communication channel 60. When the power supply management unit 113 has not shut down the control device 100 even when the predetermined time has passed after the failure cause information is received at the control device 100, the display control unit 114 further displays, on the control panel 16, that a reboot condition under which the image forming apparatus 1 reboots is not met.

The reboot management unit 213 of the main device 200 does not transmit a shutdown instruction to the control device 100 nor reboot the main device 200 when the predetermined time period (for example, 24 hours) has not passed since the last reboot, even when the communication failure in the first communication channel 60 is recoverable by rebooting according to a failure cause, such as a software error.

Figure 5:
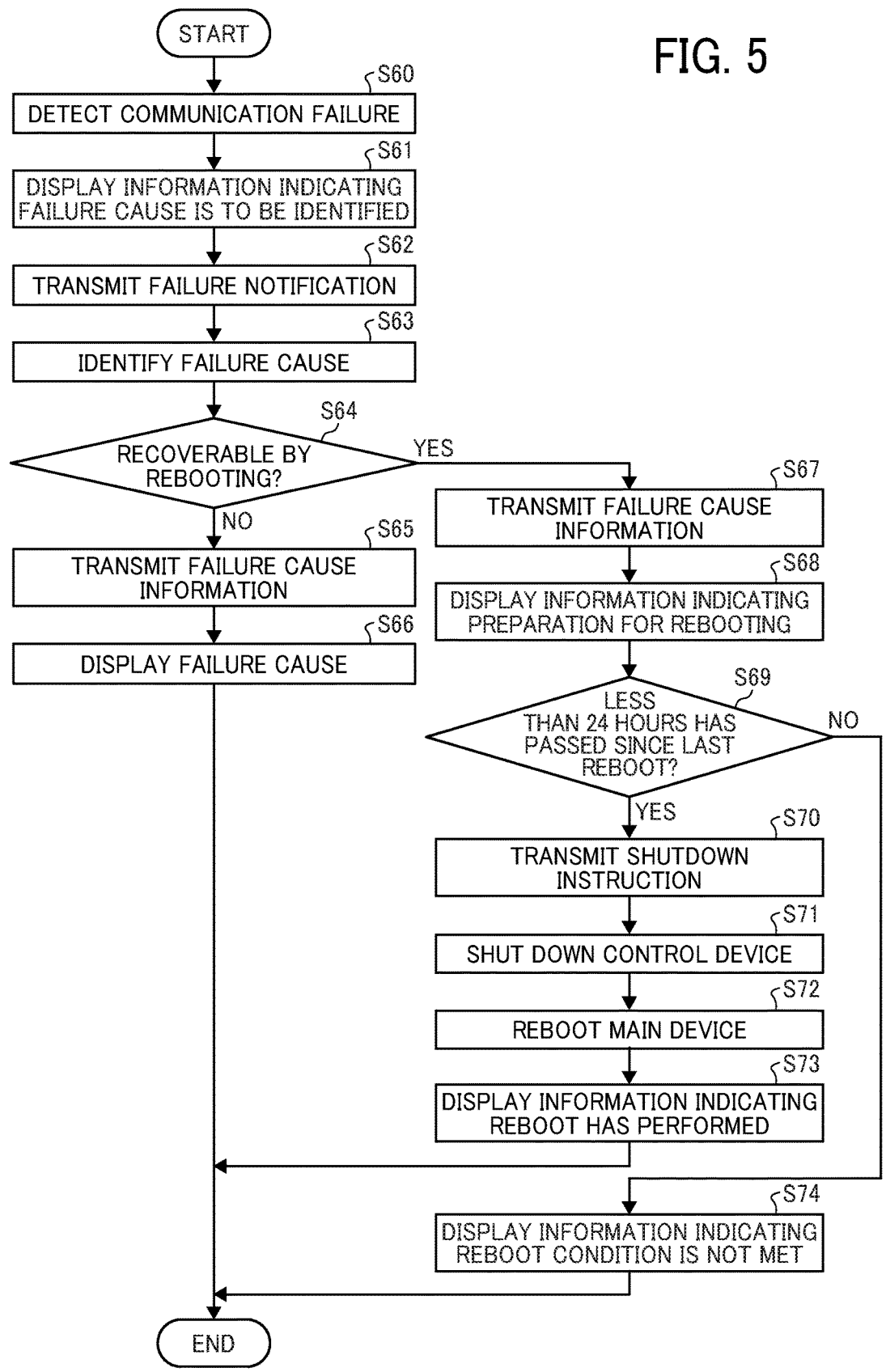
FIG. 5 is a flowchart illustrating reboot operation of the image forming apparatus according to a modification of the first embodiment.

Reboot operation of the image forming apparatus 1 according to the first modified embodiment is described below. FIG. 5 is a flowchart illustrating the reboot operation of the image forming apparatus 1 according to the first modified embodiment. The operation of FIG. 5 is performed by the control device 100 and the main device 200 that cooperate with each other.

Processing from detection of the communication failure to display of the failure cause (S60 to S66) is substantially the same as that in the first embodiment (see S10 to S16), and the description thereof is omitted.

On the other hand, when determining that the image forming apparatus 1 is able to recover from the communication failure by rebooting (S64: YES), the main device 200 sends the failure cause information indicating the identified failure cause that is possibly be solved by rebooting to the control device 100 through the second communication channel 70 (S67). Alternatively, the main device 200 may send a determination result that indicates to reboot the main device 200 instead of sending the failure cause information to the control device 100 through the second communication channel 70. The control device 100 displays information indicating that the image forming apparatus 1 is preparing for rebooting, when receiving the failure cause information, and the determination result indicating the failure cause is correctable by rebooting, which means the image forming apparatus 1 is recoverable (S68).

The main device 200, then, determines whether more than 24 hours (the predetermined time period) has passed since the last reboot of the image forming apparatus 1 (S69). When more than 24 hours has passed since the last reboot, namely the image forming apparatus 1 is to reboot after 24 hours has passed since the last reboot (S69: YES), the main device 200 transmits the shutdown instruction to the control device 100 (S70), and the control device 100 shuts down in response to the received shutdown instruction (S71). When the control device 100 shuts down, the main device 200 reboots (S72).

The main device 200 sends to the control device 100 a reboot completion notification and the control device 100 displays that the image forming apparatus 1 has rebooted (S73). This allows the main device 200 and the control device 100 to communicate to each other through the first communication channel 60, resulting in normal operation of the image forming apparatus 1.

In S69, when 24 hours has not passed, namely when less than 24 hours has passed since the last reboot (S69: NO), the main device 200 does not reboot to avoid rebooting continuously. Subsequently, the control device 100 causes the control panel 16 to display that the reboot condition for rebooting the image forming apparatus 1 is not met, when the first predetermined time has passed without shutdown since the reception of the failure cause information (S74).

Figure 6:
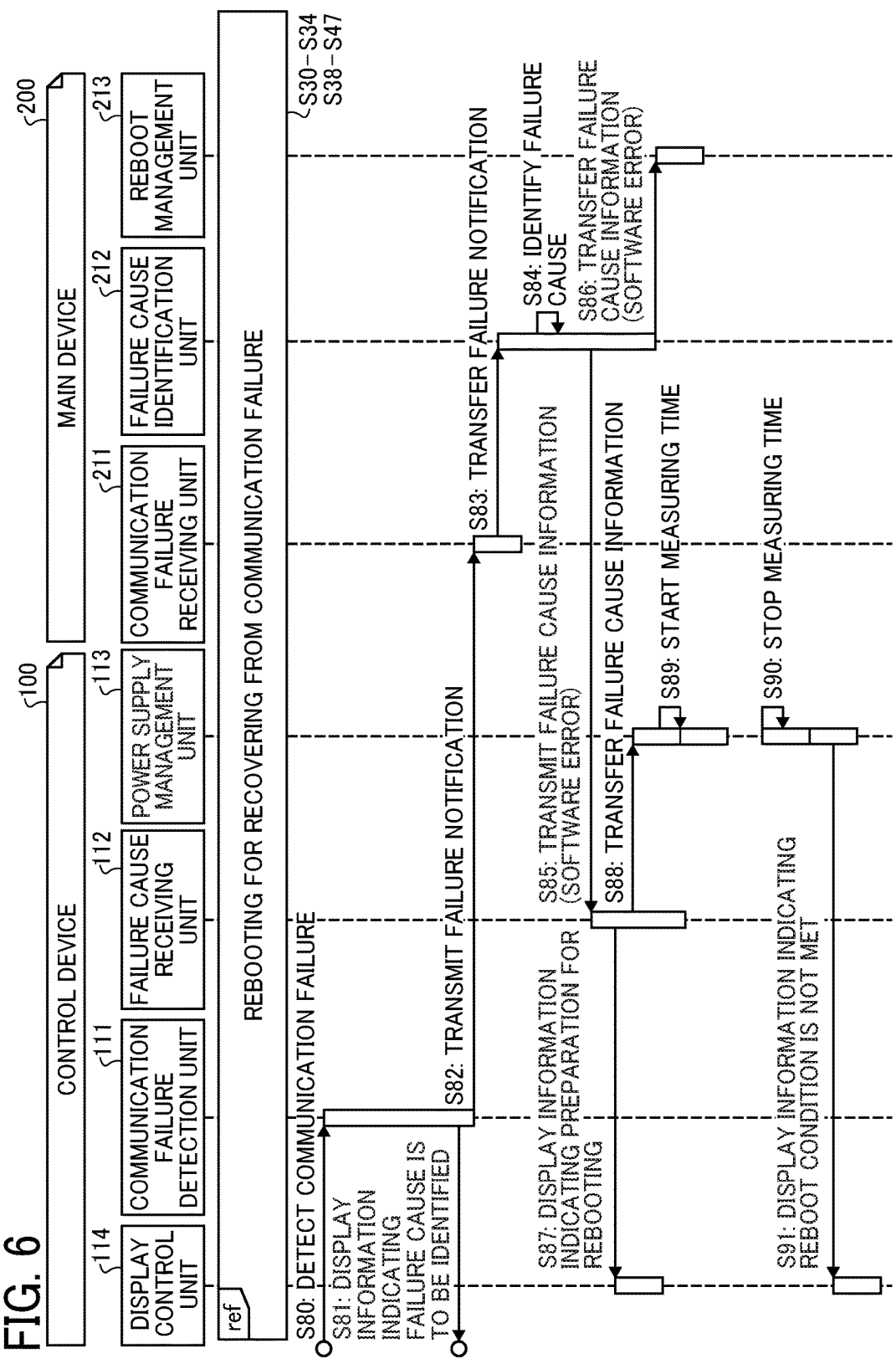
FIG. 6 is a sequence diagram illustrating operation of rebooting of the image forming apparatus according to the modification of the first embodiment.

A detailed description of the reboot operation of the image forming apparatus 1 according to the first modified embodiment is given below with reference to FIG. 6. FIG. 6 is a sequence diagram illustrating an operation flow of the image forming apparatus 1 performing the reboot operation according to the first modified embodiment. FIG. 6 illustrates the operation flow in a case where a communication failure is newly detected in 24 hours after a recovery process by rebooting (S30 to S34 and S38 to S47 in FIG. 4) the last time to recover from the last communication failure, and the image forming apparatus 1 does not reboot. In FIG. 6, the control device 100 and the main device 200 communicate to each other via the communication control unit 101 and the communication control unit 201 (see FIG. 2).

Processing from detection of the communication failure in the first communication channel 60 to display of the failure cause (S80 to S84) is substantially the same as that in the first embodiment (see S30 to S34), and the description thereof is omitted.

When the failure cause of the communication failure in the first communication channel 60 is, for example, a software error, the failure cause identification unit 212 transmits to the control device 100 the failure cause information, which indicates that the failure cause is the software error, with the hardware signal through the second communication channel 70 (S85). The failure cause identification unit 212 also transfers the failure cause information to the reboot management unit 213 (S86). The reboot management unit 213 of the main device 200 does not transmit the shutdown instruction to the control device 100 nor reboot the main device 200 when 24 hours, the predetermined time period has not passed since the last reboot.

When the failure cause receiving unit 112 of the control device 100 receives the failure cause information from the main device 200, the display control unit 114 causes the control panel 16 to display information indicating that the image forming apparatus 1 is preparing for rebooting (S87) to inform the user thereof.

The failure cause receiving unit 112 also transfers the failure cause information to the power supply management unit 113 (S88). The power supply management unit 113 starts measuring a time with the timer 18, which may alternatively be implemented by software, when receiving the failure cause information (S89).

The power supply management unit 113 that receives the failure cause information indicating that the failure cause is the predetermined cause, which is correctable, such as a software error, controls not to shut down the control device 100 unless a shutdown instruction is received, for the first predetermined time period, for example, one minute by the control device 100 after the reception of the failure cause information (S90). Then, the display control unit 114 causes the control panel 16 to display that the reboot condition for rebooting the image forming apparatus 1 is not met (S91).

As described above, in the image forming apparatus 1 according to the first modified embodiment, when the communication failure occurs in the first communication channel 60 that uses the software communication with a software signal between the control device 100 and the main device 200, the failure notification, which indicates the communication failure in the first communication channel 60, is transmitted from the control device 100 to the main device 200 through the second communication channel 70 with the hardware signal. The main device 200 then identifies the failure cause of the communication failure in the first communication channel 60 and sends the failure cause information to the control device 100 through the second communication channel 70. When the failure cause is correctable by rebooting the image forming apparatus 1 and when the predetermined time period, for example, 24 hours, has passed since the last reboot, the main device 200 causes the control device 100 to shut down and reboots. As described above, the image forming apparatus 1 in which the main device 200 and the control device 100 are provided independently of each other is able to recover from such an abnormal state where the communication failure occurs between the main device 200 and the control device 100. Additionally, the image forming apparatus 1 according to the first modified embodiment does not reboot unless the predetermined time period has passed since the last reboot and this prevents the image forming apparatus 1 from rebooting continuously without the recovery of the image forming apparatus 1.

Second Embodiment

The image forming apparatus 1 according to the first embodiment includes the control device 100 and the main device 200. An image forming apparatus 2 according to a second embodiment includes a microcomputer in addition to a control device and a main device. The microcomputer corresponds to an example of a management device.

Figure 7:
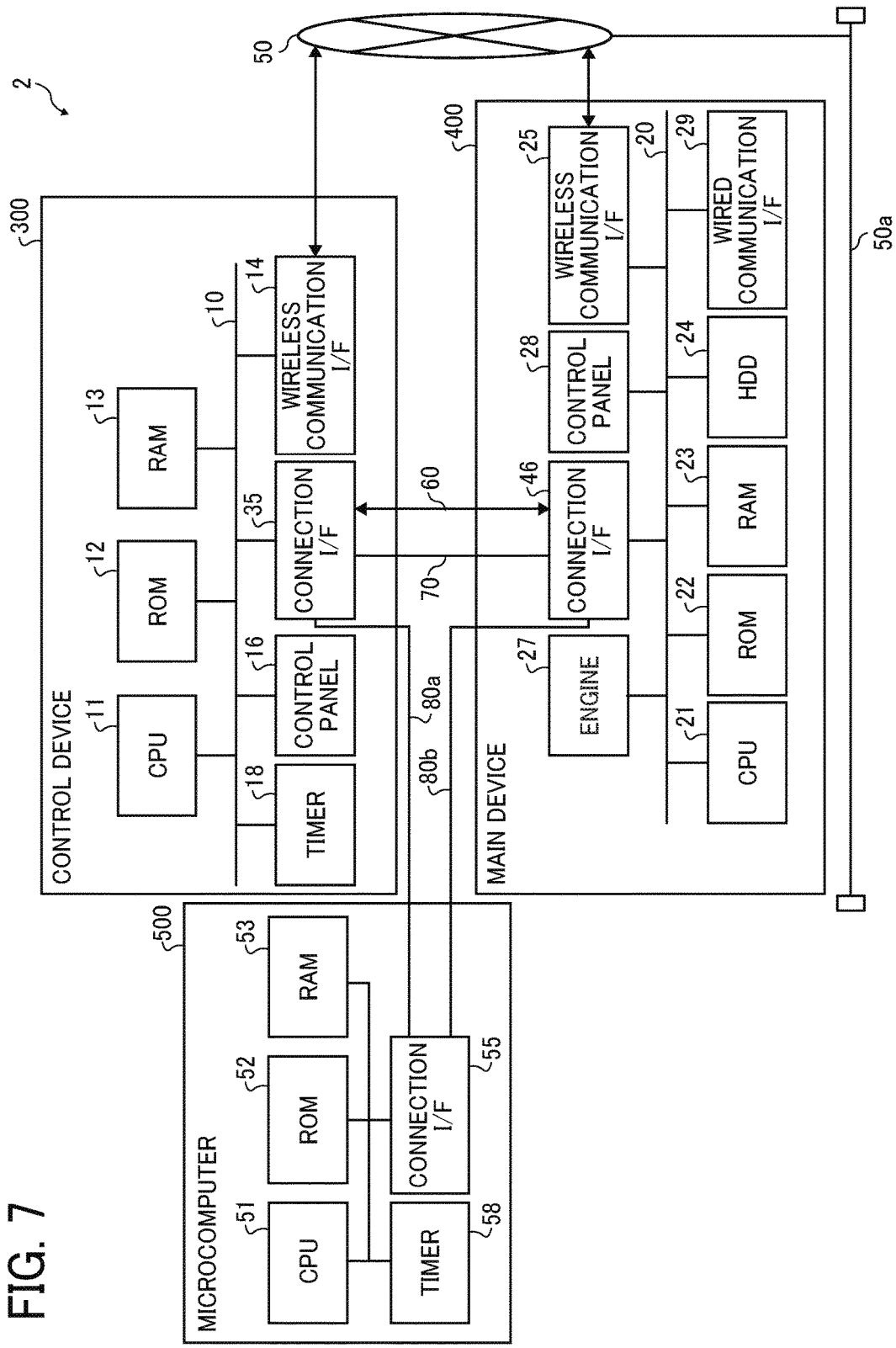
FIG. 7 is a block diagram illustrating a hardware configuration of an image forming apparatus according to a second embodiment.

FIG. 7 is a block diagram illustrating a hardware configuration of the image forming apparatus 2 according to the second embodiment. As illustrated in FIG. 7, the image forming apparatus 2 includes a control device 300, which is one example of an external device (auxiliary device), a main device 400, and a microcomputer 500.

As illustrated in FIG. 7, the control device 300 includes a CPU 11, a ROM 12, a RAM 13, a wireless communication I/F 14, a connection I/F 35, a control panel 16, and a timer 18. The above-mentioned components are connected to each other through an internal bus 10. Functions and configurations of the CPU 11, the ROM 12, the RAM 13, the wireless communication I/F 14, and the control panel 16 are the same as those in the first embodiment.

The connection I/F 35 is, for example, a wired interface for a wired connection and communicates with the main device 400 through a first communication channel 60 and a second communication channel 70 and communicates with the main device 400 through another second communication channel 80a and still another second communication channel 80b via the microcomputer 500. The first communication channel 60 and the second communication channel 70 are substantially the same as those in the first embodiment. Configurations and communication methods of the second communication channels 80a and 80b are the same as the second communication channel 70.

The second communication channel 80a transmits a hardware signal between the control device 300 and the microcomputer 500. The second communication channel 80b transmits a hardware signal between the microcomputer 500 and the main device 400. When a communication failure such that the software communication fails to be established with the first communication channel 60 occurs, the second communication channels 80a and 80b are used for hardware communication established between the control device 300 and the main device 400 via the microcomputer 500.

As illustrated in FIG. 7, the main device 400 includes a CPU 21, a ROM 22, a RAM 23, an HDD 24, a wireless communication I/F 25, a connection I/F 46, an engine 27, a control panel 28, and a wired communication I/F 29. The above-mentioned components are connected to each other through an internal bus 20. Functions and configurations of the CPU 21, the ROM 22, the RAM 23, the HDD 24, the wireless communication I/F 25, the engine 27, the control panel 28, and the wired communication I/F 29 are the same as those in the first embodiment.

The connection I/F 46 is, for example, an interface for a wired connection, and communicates with the control device 300 through the first communication channel 60 and the second communication channel 70 and communicates with the control device 300 through the second communication channel 80a and the second communication channel 80b via the microcomputer 500.

Additionally, as illustrated in FIG. 7, the microcomputer 500 includes a CPU 51, a ROM 52, a RAM 53, a connection I/F 55, and a timer 58, which are connected to each other through an internal bus.

The CPU 51 controls overall operation of the microcomputer 500. The CPU 51 executes a program stored in, for example, the ROM 52 using the RAM 53 as a work area. The connection I/F 55 is, for example, a wired interface for a wired connection and used for a hardware communication established between the control device 300 and the microcomputer 500 through the second communication channel 80a and another hardware communication established between the main device 400 and the microcomputer 500 through the second communication channel 80b. With this configuration, the microcomputer 500 mediates communication between the control device 300 and the main device 400.

Figure 8:
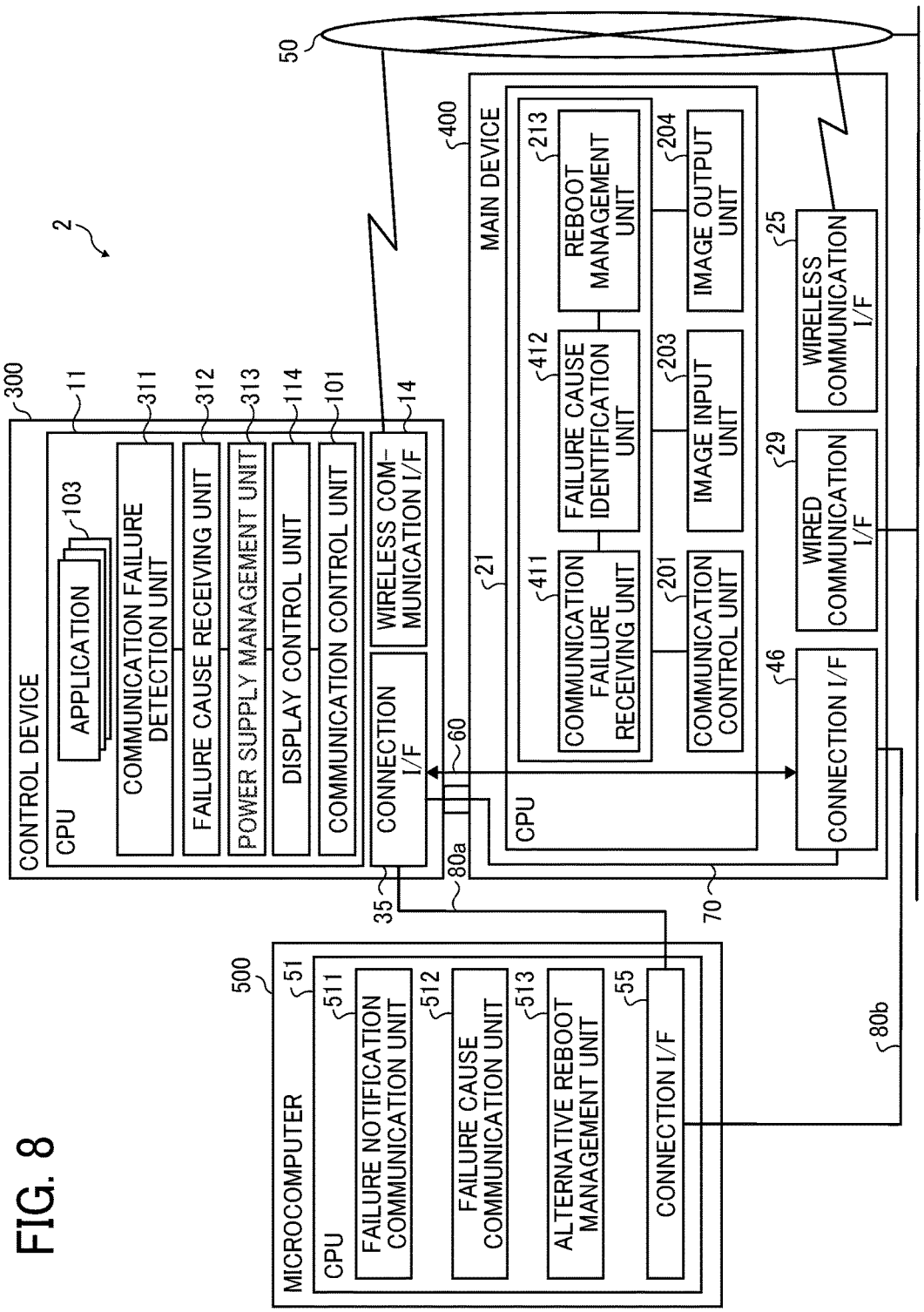
FIG. 8 is a block diagram illustrating a functional configuration of the image forming apparatus according to the second embodiment.

FIG. 8 is a block diagram illustrating a functional configuration of the image forming apparatus 2 according to the second embodiment. By executing the program read from the ROM 12 onto the RAM 13 with the CPU 11, the control device 300 of FIG. 8 implements a communication control unit 101, a communication failure detection unit 311, a failure cause receiving unit 312, a power supply management unit 313, and a display control unit 114. The CPU 11 also executes an application 103 stored in any desired memory. Functions and configurations of the communication control unit 101, the application 103, and the display control unit 114 are the same as those in the first embodiment, and the description of those is omitted.

The communication failure detection unit 311 detects a communication failure occurring in the first communication channel 60, which is used for a software communication established between the control device 300 and the main device 400. A method of detecting the communication failure is the same as that in the first embodiment.

When detecting the communication failure in the first communication channel 60, the communication failure detection unit 311 sends a failure notification (failure information) indicating that the communication failure occurs in the first communication channel 60 to the microcomputer 500 with a hardware signal through the second communication channel 80a. Then, the microcomputer 500 sends the failure notification to the main device 400.

After the failure notification indicating the communication failure in the first communication channel 60 is transmitted to the main device 400 from the control device 300 via the microcomputer 500, the failure cause receiving unit 312 receives failure cause information indicating a cause of the communication failure. The failure cause information is sent from the main device 400 to the microcomputer 500 through the second communication channel 80b and from the microcomputer to the failure cause receiving unit 312 of the control device 300 through the second communication channel 80a. Alternatively or additionally, the failure cause receiving unit 312 may receive a determination result indicating whether or not to reboot the main device 400, which is sent from the main device 400 to the microcomputer 500 through the second communication channel 80b and from the microcomputer 500 to the failure cause receiving unit 312 of the control device 300 through the second communication channel 80a.

The power supply management unit 313 manages the power supply of the control device 300. The power supply management unit 313 also receives, from the main device 400 through the second communication channels 80a and 80b via the microcomputer 500, a shutdown instruction when a cause of the communication failure occurring in the first communication channel 60 corresponds to a predetermined cause that is possible to be solved to recover the image forming apparatus 2 from the communication failure by rebooting or when the determination result indicates to reboot the main device 400. When receiving the shutdown instruction, the power supply management unit 313 shuts down the control device 300. The predetermined cause mentioned above is the same as that in the first embodiment.

A functional configuration of the main device 400 is described below. Referring to FIG. 8, the main device 400 includes a communication control unit 201, an image input unit 203, an image output unit 204, a communication failure receiving unit 411, a failure cause identification unit 412, and a reboot management unit 213. The functional units mentioned above of the main device 400 are implemented by executing a program read from the ROM 22 onto the RAM 23 with the CPU 21. Functions and configurations of the communication control unit 201, the image input unit 203, the image output unit 204, and the reboot management unit 213 are the same as those in the first embodiment, and the description of those is omitted.

When the control device 300 detects the communication failure in the first communication channel 60, the communication failure receiving unit 411 receives the failure notification sent from the control device 300 with the hardware signal through the second communication channels 80a and 80b via the microcomputer 500.

The failure cause identification unit 412 determines and identifies the cause of the communication failure occurring in the first communication channel 60 in response to the failure notification received from the control device 300. A method for identifying a failure cause is the same as that in the first embodiment.

The failure cause identification unit 412 sends to the control device 300 the identified cause of the communication failure in the first communication channel 60 through the second communication channels 80a and 80b via the microcomputer 500.

By executing the program read from the ROM 52 onto the RAM 53 with the CPU 51, the microcomputer 500 of FIG. 8 implements a failure notification communication unit 511, a failure cause communication unit 512, and an alternative reboot management unit 513.

The failure notification communication unit 511 receives the notification failure sent from the control device 300 through the second communication channel 80a with the hardware communication. When receiving the failure notification, the failure notification communication unit 511 sends the received notification failure to the main device 400 through the second communication channel 80b with the hardware communication. When receiving the failure notification, the failure notification communication unit 511 transfers the failure notification to the alternative reboot management unit 513.

The failure cause communication unit 512 receives the failure cause from the main device 400 through the second communication channel 80b with the hardware communication. When receiving the failure cause, the failure cause communication unit 512 transmits the received failure cause to the control device 300 through the second communication channel 80a with the hardware communication. When transmitting the failure cause, the failure cause communication unit 512 transfers the failure cause to the alternative reboot management unit 513. Alternatively, the failure cause communication unit 512 may send or receive the determination result that indicates to reboot the main device 400, instead of sending or receiving the failure cause information.

The alternative reboot management unit 513 starts measuring time with a timer when receiving the failure cause information. Alternatively the function of the timer 58 maybe implemented as software. The alternative reboot management unit 513, which has sent the failure notification to the main device 400, stops measuring the time with the timer 58 when receiving the failure cause from the main device 400 in a predetermined time (for example, in 1 minute). After that, when receiving a shutdown instruction from the main device 400 with the hardware communication through the second communication channel 80b, the alternative reboot management unit 513 transmits the shutdown instruction to the control device 300 with the hardware communication through the second communication channel 80a.

On the other hand, the alternative reboot management unit 513 determines that there is an error cause in the main device 400 if not receiving the failure cause from the main device 400 in the predetermined time after sending the failure notification to the main device 400. Subsequently, the alternative reboot management unit 513 transmits the shutdown instruction to the control device 300 with the hardware signal through the second communication channel 80a. Subsequently, the alternative reboot management unit 513 reboots the main device 400, when detecting the shutdown of the control device 300, by turning off and then turning on the main device 400.

The following is description of an operation flow of the image forming apparatus 2 when the communication failure occurs in the first communication channel 60. FIG. 9 is a schematic diagram illustrating the operation flow of the image forming apparatus 2 when a communication failure occurs in a communication channel.

When a communication failure related to software communication between the control device 300 and the main device 400 occurs (S100), the control device 300 detects the communication failure (S101). The control device 300, which detects the communication failure, transmits a failure notification indicating occurrence of the communication failure to the microcomputer 500 with the hardware communication (S102).

The microcomputer 500 transfers the failure notification received from the control device 300 to the main device 400 with the hardware communication (S103). When receiving the failure notification, the main device 400 identifies a failure cause of the communication failure (S104).

At this time, if having the error cause in itself, the main device 400 is not able to transmit the shutdown instruction, even when the communication failure is recoverable by rebooting the image forming apparatus 2. The microcomputer 500, accordingly, transmits the shutdown instruction to the control device under a certain condition, which is, for example, the predetermined time has passed without receiving a signal from the main device 100 as described above, instead of the main device 400 (S105). The microcomputer 500 then causes the main device 400 to reboot, thereby rebooting the image forming apparatus 2 (S106).

Figure 10A:
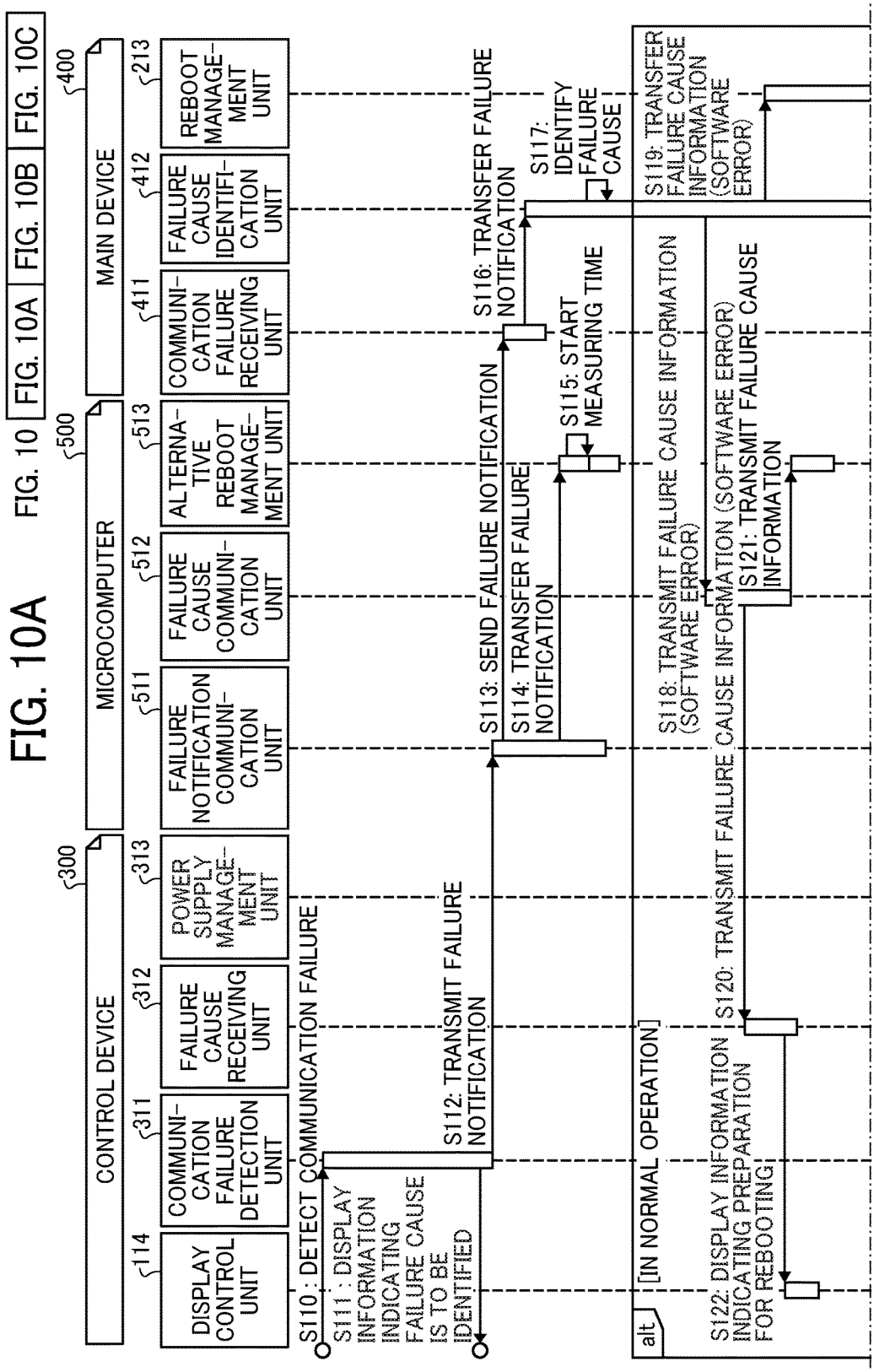
Figure 10B:
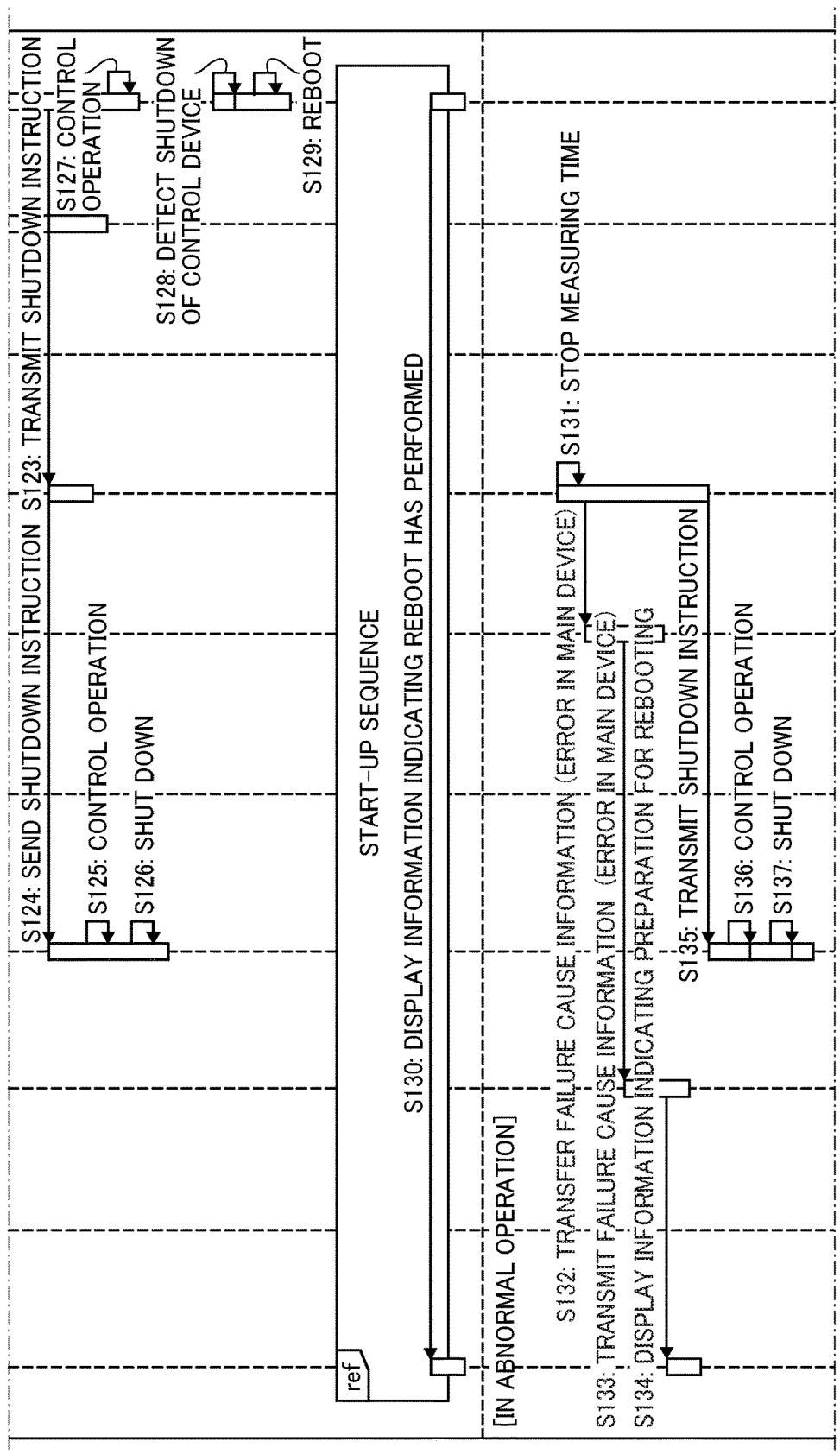

A detailed description of the reboot operation of the image forming apparatus 2 according to the embodiment is given below with reference to FIG. 10. FIG. 10 (FIGS. 10A, 10B, and 10C) is a sequence diagram illustrating an operation flow of the image forming apparatus 2 performing the reboot operation according to the second embodiment. In FIG. 10 (FIGS. 10A, 10B, and 10C), the control device 300 and the main device 400 communicate to each other via the communication control unit 101 and the communication control unit 201 (see FIG. 8).

The communication failure detection unit 311 of the control device 300 detects a communication failure in the first communication channel 60 (S110), and the display control unit 114 causes the control panel 16 to display information indicating that a cause of the communication failure occurring in the first communication channel 60 is to be identified (S111).

The communication failure detection unit 311, then, transmits to the microcomputer 500 a failure notification indicating that the communication failure occurs in the first communication channel 60 with a hardware signal through the second communication channel 80a (S112). When receiving the failure notification, the failure notification communication unit 511 of the microcomputer 500 sends the failure notification with the hardware signal to the main device 400 through the second communication channel 80b (S113).

The failure notification communication unit 511 transfers the failure notification to the alternative reboot management unit 513 (S114), and the alternative reboot management unit 513 starts measuring time with the timer 58 when receiving the failure cause (S115). Here the timer 58 may be implemented as software.

When receiving the failure notification from the microcomputer 500, the communication failure receiving unit 411 of the main device 400 transfers the failure notification to the failure cause identification unit 412 (S116). The failure cause identification unit 412 determines and identifies the cause of the communication failure occurring in the first communication channel 60 (for example, a hardware error, a cable failure, or a software error) in response to the failure notification (S117).

The following describes a case where the main device 400 operates normally without any error in itself. When the failure cause is, for example, a software error, the failure cause identification unit 412 transmits to the microcomputer 500 with the hardware signal through the second communication channel 80b, failure cause information indicating that the image forming apparatus 2 is recoverable and the failure cause is the software error (S118). The failure cause identification unit 412 also transfers the failure cause information to the reboot management unit 213 (S119).

When receiving the failure cause information, which indicates that the image forming apparatus 2 is recoverable and the failure cause is the software error, the failure cause communication unit 512 of the microcomputer 500 transfers the failure cause information received from the main device 400 to the control device 300 (S120). The failure cause communication unit 512 also transfers the failure cause information to the alternative reboot management unit 513 (S121).

When the failure cause receiving unit 112 of the control device 300 receives the failure cause information, which indicates the failure cause is the software error, and the determination result, which indicates that the image forming apparatus 2 is able to recover from the microcomputer 500, the display control unit 114 of the control device 300 causes the control panel 16 to display contents corresponding to the failure cause information and the determination result (S122) to inform the user thereof.

Subsequently, the reboot management unit 213 of the main device 400 transmits to the microcomputer 500 a shutdown instruction with the hardware signal, through the second communication channel 80b (S123). When receiving the shutdown instruction, the alternative reboot management unit 513 of the microcomputer 500 transfers the shutdown instruction to the control device 300 through the second communication channel 80a with the hardware communication (S124). The power supply management unit 313, which receives the shutdown instruction, controls the control device 300 (S125), and shuts down the control device 300 (S126).

The reboot management unit 213 that controls current operation performed by the main device 400 for preparation for reboot (S127). When the reboot management unit 213 detects the shutdown of the control device 300 (S128), the reboot management unit 213 reboots the main device 400 (S129).

After the image forming apparatus 2 reboots, or restarts, the main device 400 and the control device 300 communicate normally to each other, resulting in establishment normal software communication through the first communication channel 60. The reboot management unit 213 sends a reboot completion notification to the control device 300 with the software signal through the first communication channel 60, and the display control unit 114 causes the control panel 16 to display that the image forming apparatus 2 has rebooted (S130). After that, the image forming apparatus 2 performs various processing, such as image forming.

On the other hand, another case where the main device 400 has an error cause of the communication failure in itself is described below. In this case, the failure cause is, for example, a software error in the main device 400. When completing measuring the time with the timer 58, which means the predetermined time has passed, without receiving the failure cause information from the main device 400 (S131), the alternative reboot management unit 513 transfers failure cause information indicating that there is an error occurring in the main device 400 to the failure cause communication unit 512 (S132).

When receiving the failure cause information, which indicates that the communication failure is caused by the error in the main device 400, from the alternative reboot management unit 513, the failure cause communication unit 512 transfers the received failure cause information to the control device 300 (S133). When the failure cause receiving unit 312 of the control device 300 receives the failure cause information from the microcomputer 500, the display control unit 114 causes the control panel 16 to display information indicating that the image forming apparatus 2 is preparing for rebooting (S134) to inform the user thereof.

Subsequently, the alternative reboot management unit 513 of the microcomputer 500 transmits to the control device 300 a shutdown instruction with a hardware signal through the second communication channel 80a (S41). The power supply management unit 313, which receives the shutdown instruction from the microcomputer 500, controls the control device 300 (S136), and shuts down the control device 300 (S137).

Then the alternative reboot management unit 513 detects the shutdown of the control device 300 (S138), and reboots the main device 400 by turning off the main device 400 (S139) and then turning on the main device 400 (S140). Through this, the image forming apparatus 2 restarts.

As described above, in the image forming apparatus 2 according to the second embodiment, when the communication failure occurs in the first communication channel 60 transmitting a software signal between the control device 300 and the main device 400, the failure notification is sent from the control device 300 to the main device 400 with the hardware signal via the microcomputer 500 through the second communication channels 80a and 80b. The main device 400 identifies the failure cause of the communication failure, and sends the failure cause information to the control device 300 via the microcomputer 500 through the second communication channels 80a and 80b. When the failure cause is not an error in the main device 400, but the predetermined cause that is correctable by rebooting the image forming apparatus 2, the main device 400 causes the control device 300 to shut down via the microcomputer 500 and the main device 400 reboots. Through this, the image forming apparatus 2 in which the main device 400 and the control device 300 are provided independently of each other is able to recover from such an abnormal state where the communication failure occurs between the main device 400 and the control device 300.

Additionally, when the failure cause is an error in the main device 400 and the microcomputer 500 receives no failure cause information from the main device 400 after sending the failure notification to the main device 400, the microcomputer 500 causes the control device 300 to shut down under the certain condition and reboots the main device 400. This allow the image forming apparatus 2 to reboot even when the failure cause is the error in the main device 400. Accordingly, the image forming apparatus 2 recovers from such an abnormal state where the communication failure occurs between the main device 400 and the control device 300. In the description of the second embodiment, the second communication channels 80a and 80b are used to transmit all of the signals, however the embodiment is not limited this. For example, part of the communication established between the control device 300 and the main device 400 via the microcomputer 500 using the second communication channels 80a and 80b may be replaced with communication established through the second communication channel 70 without using the microcomputer 500. Additionally, the second communication channel 70 may not be provided.

Furthermore, there is also a case where the image forming apparatus 2 is not be able to recover from a communication failure by rebooting even when a failure cause is to be correctable by rebooting. To avoid continuous rebooting of the image forming apparatus 2 in such a case, the alternative reboot management unit 513 may be configured similar to the power supply management unit 113 in the first modified embodiment, in which and the alternative reboot management unit 513 may determine whether or not to reboot according to a reboot condition, such as an elapsed time, which is modification of the second embodiment, a second modified embodiment.

That is, the alternative reboot management unit 513 does not transmit to the control device 300 a shutdown instruction nor reboot the main device 400 in a situation such that a predetermined time period (for example, 24 hours) has not passed since the last reboot, even when a communication failure in the first communication channel 60 is possible to be solved because the failure cause is the predetermine cause, such as a software error.

Accordingly, the image forming apparatus 2 according to the second modified embodiment does not reboot when the predetermined time period has not passed since the last reboot and this prevents the image forming apparatus 2 from rebooting continuously without the recovery.

Third Embodiment

An image forming apparatus 3 according to a third embodiment is described below. The image forming apparatus 3 according to the third embodiment establishes a software communication and a short-range wireless communication between a control device 700 and a main device 800. As an example of the short-range wireless communication, a near field communication (NFC) is used to describe the embodiment.

Figure 11:
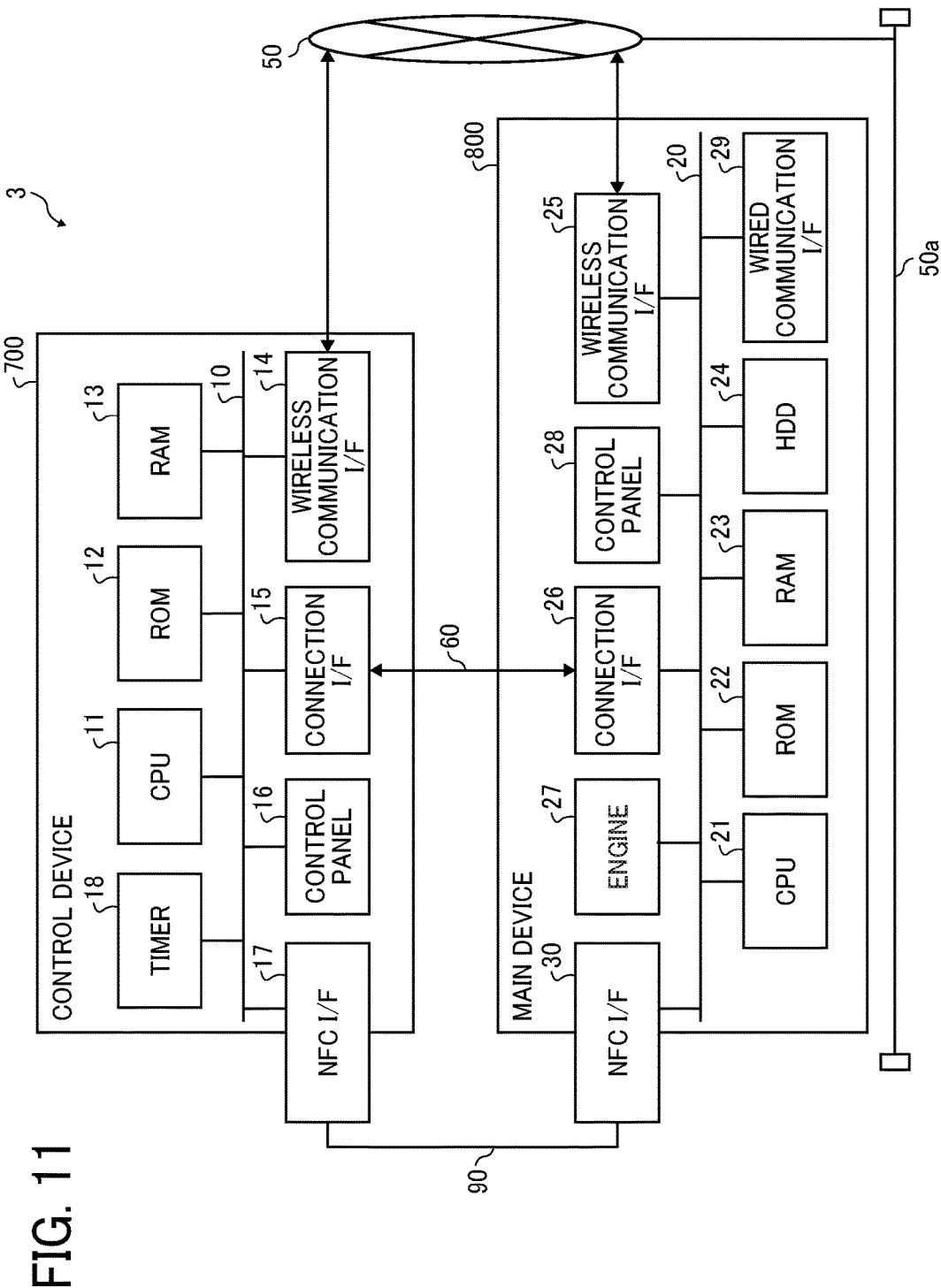
FIG. 11 is a block diagram illustrating a hardware configuration of an image forming apparatus according to a third embodiment.

FIG. 11 is a hardware configuration of the image forming apparatus 3. As illustrated in FIG. 11, the image forming apparatus 3 includes the control device 700, which is one example of an external device (auxiliary device), and the main device 800.

The control device 700 illustrated in FIG. 11 includes a CPU 11, a ROM 12, a RAM 13, a wireless communication I/F 14, a connection I/F 15, a control panel 16, a NFC I/F 17, and a timer 18. The above-mentioned components are connected to each other through an internal bus 10. Functions and configurations of the CPU 11, the ROM 12, the RAM 13, the wireless communication I/F 14, the connection I/F 15, and the control panel 16 are the same as those in the first embodiment, and the description of those is omitted.

The NFC I/F 17 is an interface for the NFC connection, and communicates with the main device 800 through a second communication channel 90.

The second communication channel 90 is used for the short-range wireless communication, such as the NFC, established between the control device 700 and the main device 800. When a communication failure occurs, in which, for example, the software communication fails to be established through the first communication channel 60, the control device 700 and the main device 800 establish the NFC through the second communication channel 90.

As illustrated in FIG. 11, the main device 800 includes a CPU 21, a ROM 22, a RAM 23, an HDD 24, a wireless communication I/F 25, a connection I/F 26, an engine 27, a control panel 28, a wired communication I/F 29, and a NFC I/F 30. The above-mentioned components are connected to each other through an internal bus 20. Functions and configurations of the CPU 21, the ROM 22, the RAM 23, the HDD 24, the wireless communication I/F 25, the connection I/F 26, the engine 27, the control panel 28, and the wired communication I/F 29 are the same as those in the first embodiment, and the description of those is omitted.

The NFC I/F 30 is an interface for the NFC connection, and communicates with the control device 700 through the second communication channel 90.

Figure 12:
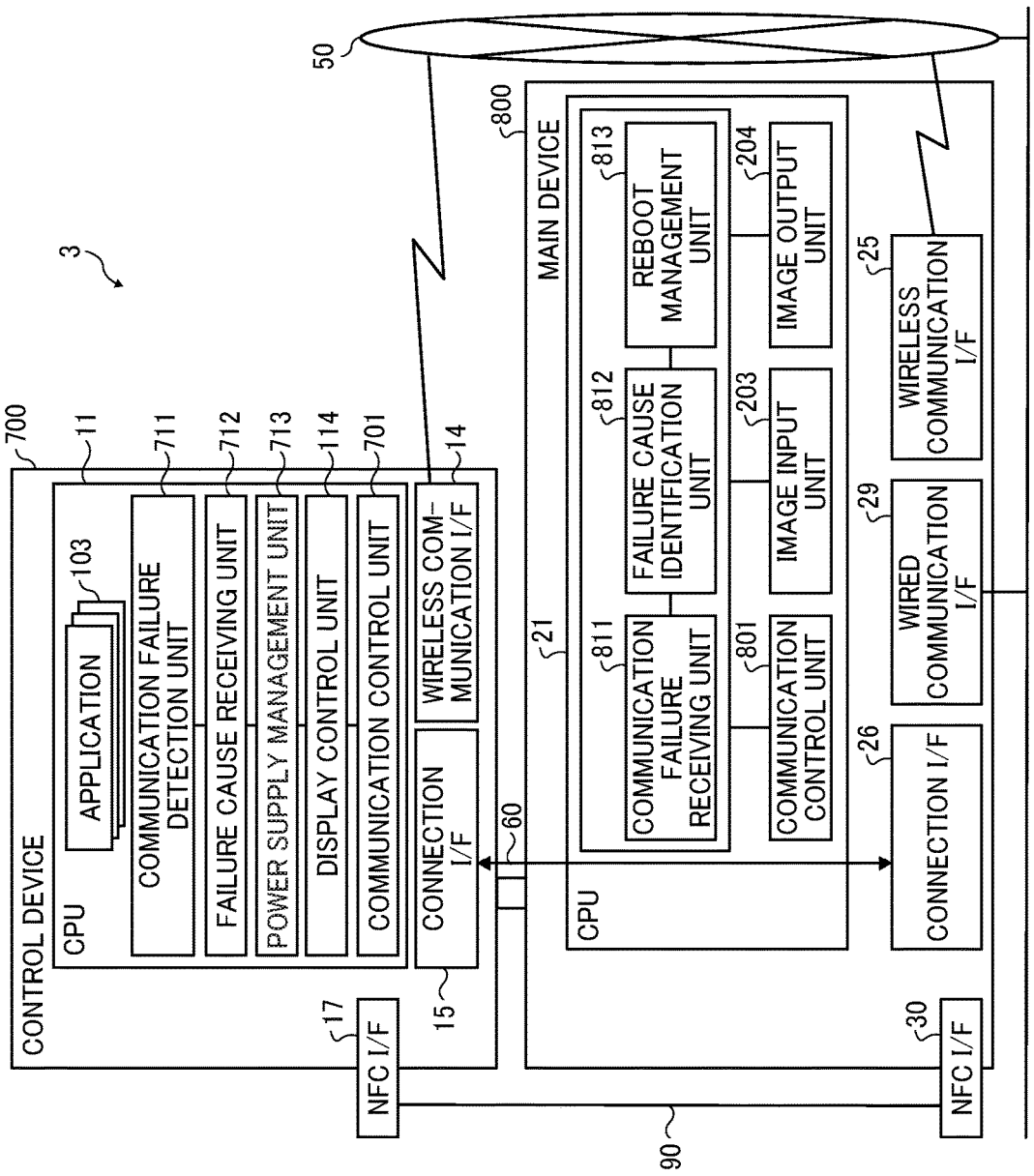
FIG. 12 is a block diagram illustrating a functional configuration of the image forming apparatus according to the third embodiment.

FIG. 12 is a block diagram illustrating a functional configuration of the image forming apparatus 3 according to the third embodiment. By executing the program read from the ROM 12 onto the RAM 13 with the CPU 11, the control device 700 of FIG. 12 implements a communication control unit 701, a communication failure detection unit 711, a failure cause receiving unit 712, a power supply management unit 713, and a display control unit 114. The CPU 11 also executes an application 103 stored in any desired memory. Functions and configurations of the application 103 and the display control unit 114 are the same as those in the first embodiment, and the description of those is omitted.

The communication control unit 701 sends to and receives from other devices, including the main device 800, information via the connection I/F 15, the wireless communication I/F 14, and the NFC I/F 17.

The communication failure detection unit 711 detects the communication failure occurring in the first communication channel 60, which is for the software communication between the control device 700 and the main device 800. A method of detecting a communication failure is the same as that in the first embodiment.

When detecting a communication failure in the first communication channel 60, the communication failure detection unit 711 sends a failure notification (failure information) indicating that the communication failure occurs in the first communication channel 60 to the main device 800 through the second communication channel 90 with NFC.

After the failure notification indicating the communication failure in the first communication channel 60 is transmitted to the main device 800, the failure cause receiving unit 712 receives failure cause information or a determination result indicating whether or not to reboot the main device 800 from the main device 800 through the second communication channel 90.

The power supply management unit 713 manages power supply of the control device 700. The power supply management unit 713 also receives, from the main device 800 through the second communication channel 90, a shutdown instruction when the failure cause of the first communication channel 60 is a predetermined cause that is possible to be cleared to recover the image forming apparatus 3 by rebooting or when the determination result indicates to reboot the main device 800. When receiving the shutdown instruction, the power supply management unit 713 shuts down the control device 700. The predetermined cause mentioned above is the same as that in the first embodiment.

A functional configuration of the main device 800 is described below. Referring to FIG. 12, the main device 800 includes a communication control unit 801, an image input unit 203, an image output unit 204, a communication failure receiving unit 811, a failure cause identification unit 812, and a reboot management unit 813. Functions and configurations of the image input unit 203 and the image output unit 204 are the same as those in the first embodiment, and the description of those is omitted.

The communication control unit 801 sends to and receives from other devices, including the main device 700, information via the connection I/F 26, the wireless communication I/F 25, the wired communication I/F 29, and the NFC I/F 30.

When the control device 700 detects the communication failure in the first communication channel 60, the communication failure receiving unit 811 receives a failure notification sent from the control device 700 with NFC through the second communication channel 90.

The failure cause identification unit 812 determines and identifies a cause of the communication failure in the first communication channel 60 when receiving the failure notification from the control device 700 or when the communication failure receiving unit 811 detects an occurrence of the communication failure in the first communication channel 60. A method for identifying a failure cause is the same as that in the first embodiment.

The failure cause identification unit 812 sends the identified failure cause of the communication failure in the first communication channel 60, namely failure cause information, to the control device 700 through the second communication channel 90. Alternatively, the failure cause identification unit 812 may send a determination result indicating whether or not to reboot the main device 800 instead of sending the failure cause information to the control device 700 through the second communication channel 90.

The reboot management unit 813 sends to the control device 700, a shutdown instruction with the short-range wireless communication, the NFC, through the second communication channel 90 when the failure cause of the first communication channel 60 is the predetermined cause such as a software error. When detecting the shutdown of the control device 700, the reboot management unit 813 controls the main device 800 and reboots the main device 800.

A detailed description of the reboot operation of the image forming apparatus 3 according to the third embodiment is given below with reference to FIG. 13. FIG. 13 (FIGS. 13A and 13B) is a sequence diagram illustrating an operation flow of the image forming apparatus 3 performing the reboot operation. In FIG. 13 (FIGS. 13A and 13B), the control device 700 and the main device 800 communicate to each other via the communication control unit 701 and the communication control unit 801 (see FIG. 12).

The communication failure detection unit 711 of the control device 700 detects a communication failure in the first communication channel 60 (S150), and the display control unit 114 causes the control panel 16 to display information indicating that a cause of the communication failure occurring in the first communication channel 60 is to be identified (S151).

The communication failure detection unit 711, then transfers a failure notification to the NFC I/F 17 (S152), and the failure notification, which indicates that the communication failure occurs in the first communication channel 60 is transmitted to the main device 800 from the NFC I/F 17 with the NFC through the second communication channel 90 (S153).

When receiving the failure notification from the control device 700, the NFC I/F 30 of the main device 800 transfers the failure notification to the communication failure receiving unit 811 (S154), and the communication failure receiving unit 811 transfers the failure notification to the failure cause identification unit 812 (S155). The failure cause identification unit 812 determines and identifies the cause of the communication failure occurring in the first communication channel 60 (for example, hardware error, cable failure, or software error) in response to the failure notification (S156).

The following describes a case where the image forming apparatus 3 is not able to recover from the communication failure, which is occurring in the first communication channel 60, by rebooting.

When the cause of the communication failure is, for example, a cable failure, the failure cause identification unit 812 transmits to the NFC I/F 30 failure cause information indicating that the image forming apparatus 1 not able to recover by rebooting and the failure cause is the cable failure (S157), and the NFC I/F 30 transfers the failure cause information to the control device 700 through the second communication channel 90 with the NFC (S158). The failure cause identification unit 812 also transfers the failure cause information to the reboot management unit 813 (S159).

When receiving the failure cause information, which indicates that the image forming apparatus 3 is not able to recover by rebooting, from the main device 800, the NFC I/F 17 of the control device 700 transfers the failure cause information to the failure cause receiving unit 712 (S160).

The failure cause receiving unit 712 transfers the failure cause information to the display control unit 114, and the display control unit 114 causes the control panel 16 to display information indicating that the image forming apparatus 3 is not able to recover by rebooting (S161) to inform a user thereof. More specifically, the control panel 16 may display a message, for example, "The cable is disconnected and the apparatus is not able to recover by rebooting. Please contact to the service center". This allows the user to deal with the situation smoothly. Then, the image forming apparatus 3 completes the process without rebooting with the reboot management unit 813 of the main device 800.

On the other hand, another case where the image forming apparatus 3 is able to recover from the communication failure occurring in the first communication channel 60 by rebooting is described below.

When the failure cause is, for example, a software error, which is possible to be solved by rebooting, the failure cause identification unit 812 transmits to the NFC I/F 30 failure cause information indicating that the image forming apparatus 3 is able to recover by rebooting and the failure cause is the software error (S162), and the NFC I/F 30 transfers the failure cause information to the control device 700 using the second communication channel 90 with the NFC (S163). The failure cause identification unit 812 also transfers the failure cause information to the reboot management unit 813 (S164).

When receiving the failure cause information, which indicates that the communication failure is possible to be solved, from the main device 800, the NFC I/F 17 of the control device 700 transfers the failure cause information to the failure cause receiving unit 712 (S165). When the failure cause receiving unit 712 receives the failure cause information, the display control unit 114 causes the control panel 16 to display information indicating that the image forming apparatus 3 is preparing for rebooting (S166) to inform the user thereof.

Subsequently, the reboot management unit 813 of the main device 800 transfers to the NFC I/F 30 a shutdown instruction (S167), and the shutdown instruction is transmitted to the control device 700 from the NFC I/F 30 through the second communication channel 90 with the NFC (S168).

The NFC I/F 17, then, transfers the shutdown instruction received to the power supply management unit 713 (S169), and the power supply management unit 713 controls the control device (S170), and shuts down the control device 700 (S171).

The reboot management unit 813 that controls current operation performed by the main device 800 for preparation for reboot (S172). When the reboot management unit 813 detects the shutdown of the control device 700 (S173), the reboot management unit 813 reboots the main device 800 (S174).

After the image forming apparatus 3 reboots, or restarts, the main device 800 and the control device 700 communicate normally to each other, resulting in establishment normal software communication through the first communication channel 60. The reboot management unit 813 sends a reboot completion notification to the control device 700 with a software signal through the first communication channel 60, indicating that the main device 200 has rebooted, and the display control unit 114 causes the control panel 16 to display information indicating that the image forming apparatus 3 has rebooted (S175). After that, the image forming apparatus 3 performs various processing, such as image forming.

As described above, in the image forming apparatus 3 according to the third embodiment, when the communication failure occurs in the first communication channel 60 transmitting a software signal between the control device 700 and the main device 800, the failure notification indicating that the communication failure occurs is transmitted to the main device 800 from the control device 700 through the second communication channel 90 with the NFC (short-range wireless communication). The main device 800 identifies a failure cause and sends failure cause information to the control device 700 through the second communication channel 90. When the failure cause is the predetermined cause, namely the cause of the communication failure is possible to be corrected by rebooting of the image forming apparatus 3, the main device 800 causes the control device 700 to shut down and reboots. Through this, the image forming apparatus 3 in which the main device 800 and the control device 700 are provided independently of each other is able to recover from such an abnormal state where the communication failure occurs between the main device 800 and the control device 700. Additionally, using the short-range wireless communication, such as an NFC, eliminates need to add a wired line, which is, for example, used in a hardware communication, even in a case that types of signals to be transmitted increase, resulting in improving convenience.

Third Modified Embodiment

As described above, the image forming apparatus 3 according to the third embodiment shuts down the control device 700 and reboots the main device 800 when a communication failure occurring in the first communication channel 60 is the predetermined cause such as a software error. The following describes modification of the third embodiment in which the image forming apparatus 3 shuts down the control device 700 and reboots the main device 800 when a communication failure occurring in the first communication channel 60 is the predetermined cause and meets a predetermined condition.

A hardware configuration of the image forming apparatus 3 according to the modification of the third modified embodiment, the third modified embodiment, is the same as the third embodiment (see FIG. 11). Differences between the third embodiment and the third modified embodiment in a functional configuration of the image forming apparatus 3 are described below with reference to FIG. 12.

A power supply management unit 713 of the control device 700 causes the timer 18, which may alternatively be implemented by software, to start measuring time when the failure cause receiving unit 712 receives the failure cause information. After receiving the failure cause information that the failure cause is the predetermined cause, which is possible to be solved, such as a software error, the power supply management unit 713 controls not to shut down the control device 700 unless a shutdown instruction is received by the control device 700, for a first predetermined time period, for example, one minute.

A display control unit 114 of the control device 700 according to the third modified embodiment displays information indicating that the image forming apparatus 3 is preparing for rebooting, when receiving the failure cause information indicating that the image forming apparatus 3 is able to recover from the communication failure occurring in the first communication channel 60. When the power supply management unit 713 has not shut down the control device 700 even when the predetermined time has passed after the failure cause information is received at the control device 700, the display control unit 114 causes the control panel 16 to display information indicating that a reboot condition under which the image forming apparatus 3 reboots is not met.

The reboot management unit 813 of the main device 800 does not transmit to the control device 700 the shutdown instruction nor reboot the main device 800 in a situation where a predetermined time period (for example, 24 hours) has not passed since the last reboot, namely the reboot condition is not met, even when the communication failure in the first communication channel 60 is the predetermined cause, such as a software error and possible to be solved.

Figure 14A:
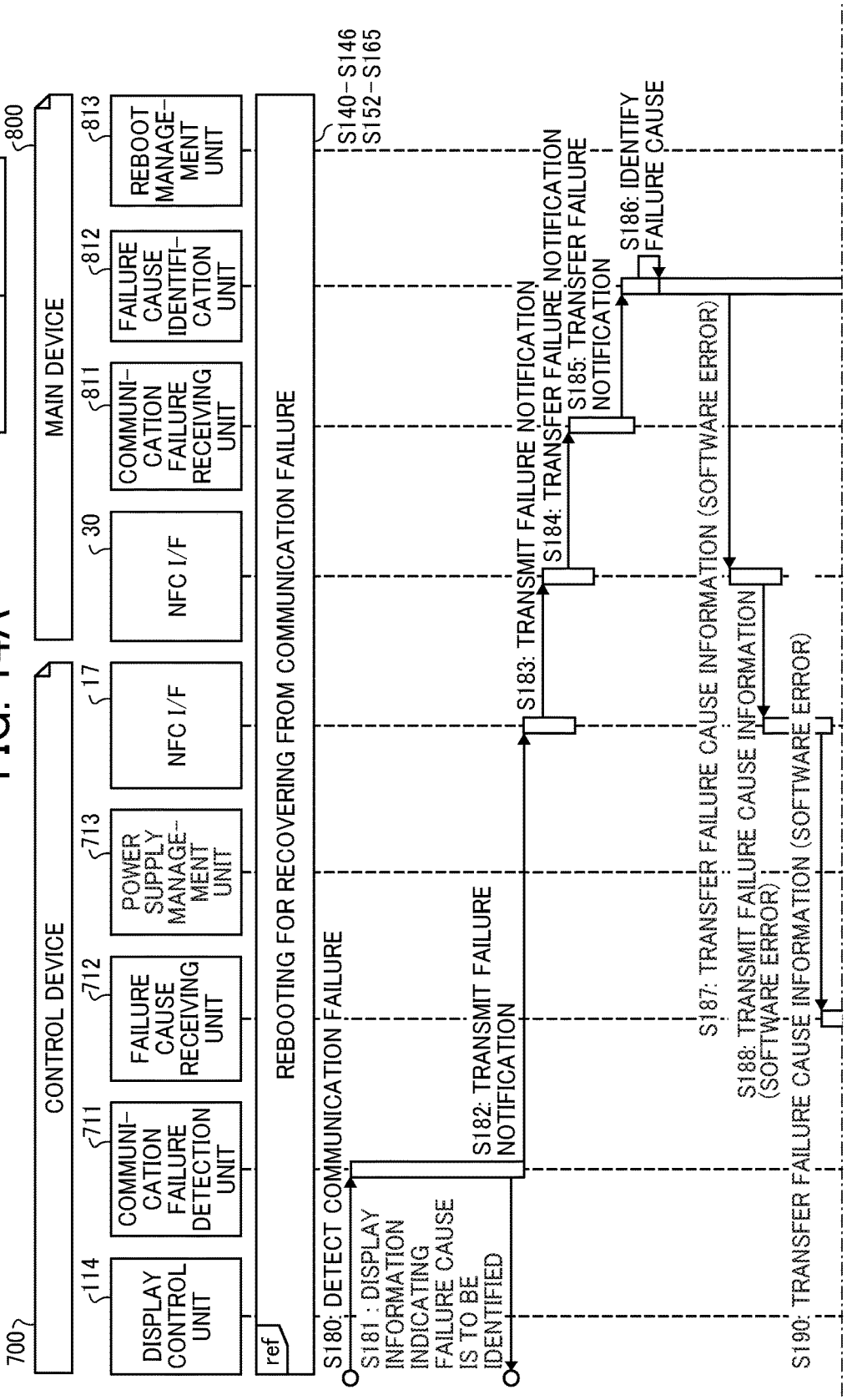
FIGS. 14A and 14B (FIG. 14) is a sequence diagram illustrating operation of rebooting of the image forming apparatus.
Figure 14B:
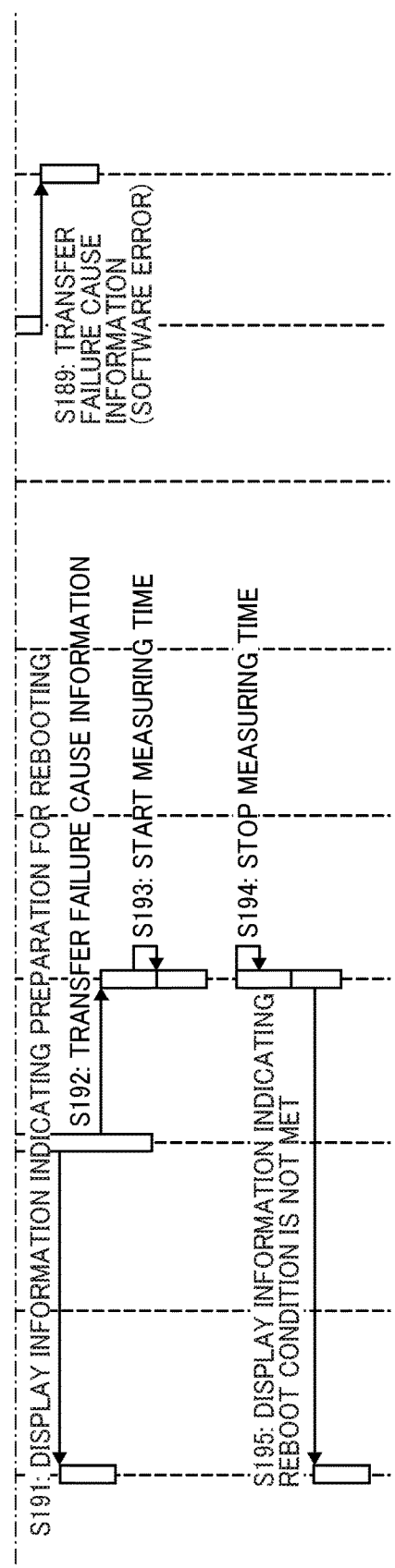

A detailed description of the reboot operation of the image forming apparatus 3 according to the third modified embodiment is given below with reference to FIG. 14. FIG. 14 (FIGS. 14A and 14B) is a sequence diagram illustrating an operation flow of the image forming apparatus 3 performing the reboot operation. FIG. 14 (FIGS. 14A and 14B) illustrates the operation flow in a case where a communication failure is detected in 24 hours after a previous recovery process of recovering from a previous communication failure by rebooting (S140 to S146 and S152 to S165 in FIG. 13 (FIGS. 13A and 13B)), and the image forming apparatus 3 does not reboot. In FIG. 14 (FIGS. 14A and 14B), the control device 700 and the main device 800 communicate to each other via the communication control unit 701 and the communication control unit 801 (see FIG. 12).

Processing from detection of the communication failure in the first communication channel 60 to display of the failure cause (S180 to S186) is substantially the same as that in the third embodiment (see S140 to S146), and the description thereof is omitted.

When the cause of the communication failure in the first communication channel 60 is, for example, a software error, the failure cause identification unit 812 transfers the failure cause information, which indicates that the failure cause is the software error, to the NFC I/F 30 (S187), and then the NFC I/F 30 transmits the failure cause information to the control device 700 through the second communication channel 90 with the NFC (S188). The failure cause identification unit 812 also transfers the failure cause information to the reboot management unit 813 (S189). The reboot management unit 813 of the main device 800 does not transmit the shutdown instruction to the control device 700 nor reboot the main device 800 when 24 hours, the predetermined time period has not passed since the last reboot.

When receiving the failure cause information from the main device 800, the NFC I/F 17 of the control device 700 transfers the failure cause information to the failure cause receiving unit 712 (S190). The display control unit 114 causes the control panel 16 to display information indicating the image forming apparatus 3 is preparing for rebooting (S191) so that a user is notified thereof.

The failure cause receiving unit 712 also transfers the failure cause information to the power supply management unit 713 (S192). The power supply management unit 713 starts measuring time with the timer 18, which may alternatively be implemented by software, when receiving the failure cause information (S193).

The power supply management unit 713 does not shut down the control device 700 unless a shutdown instruction is received by the control device 700, for the first predetermined time period, for example, one minute after the reception of the failure cause information, even when the failure cause information indicates that the failure cause is the predetermined cause, which is correctable, such as a software error (S194).

Then, the display control unit 114 causes the control panel 16 to display information indicating that the image forming apparatus 3 does not meet the reboot condition (S195). At this time, the display control unit 114 may display a message, for example, "Please turn off manually". This may prevent the user from feeling discomfort, which may given by turning off the image forming apparatus 3 despite the intention of the user.

As described above, in the image forming apparatus 3 according to the third modified embodiment, when the communication failure occurs in the first communication channel 60 transmitting a software signal between the control device 700 and the main device 800, the failure notification is sent from the control device 700 to the main device 800 through the communication channels 90 with the NFC. The main device 800 identifies a failure cause of the communication failure in the first communication channel 60 and sends failure cause information indicating the failure cause to the control device 700 through the second communication channel 90. When the cause of the communication failure is able to be cleared by rebooting the image forming apparatus 3 and when the predetermined time, for example 24 hours has passed since the last reboot, the main device 800 causes the control device 700 to shut down and reboots. Through this, the image forming apparatus 3, according to the third modified embodiment, in which the main device 800 and the control device 700 are provided independently of each other is able to recover from such an abnormal state where the communication failure occurs between the main device 800 and the control device 700. Additionally, the image forming apparatus 3 according to the third modified embodiment does not reboot when the predetermined time period has not passed since the last reboot and this avoids continuous reboot without the recovery of the image forming apparatus 3.

Fourth Embodiment

An image forming apparatus according to a fourth embodiment is described below. The image forming apparatus according to the fourth embodiment establishes a software communication and a short-range wireless communication between a control device 900 and a main device 1000.

The image forming apparatus according to the first embodiment uses a hardware signal transmitted with a wired line. With this configuration, the more types of failure cause increases, the more the number of wired lines connecting the main device and the control device is required. However, using the short-range wireless communication eliminates the need to add wired lines even when types of information transmitted through communication increases. For example, the image forming apparatus according to the fourth embodiment transmits additional information between a main device and a control device. For example, the image forming apparatus according to the fourth embodiment determines whether a type and a version of the main device is supported by the control device and then reboot according to the determination.

A hardware configuration of the image forming apparatus according to the fourth embodiment is the same as that of the third embodiment (see FIG. 11).

Figure 15:
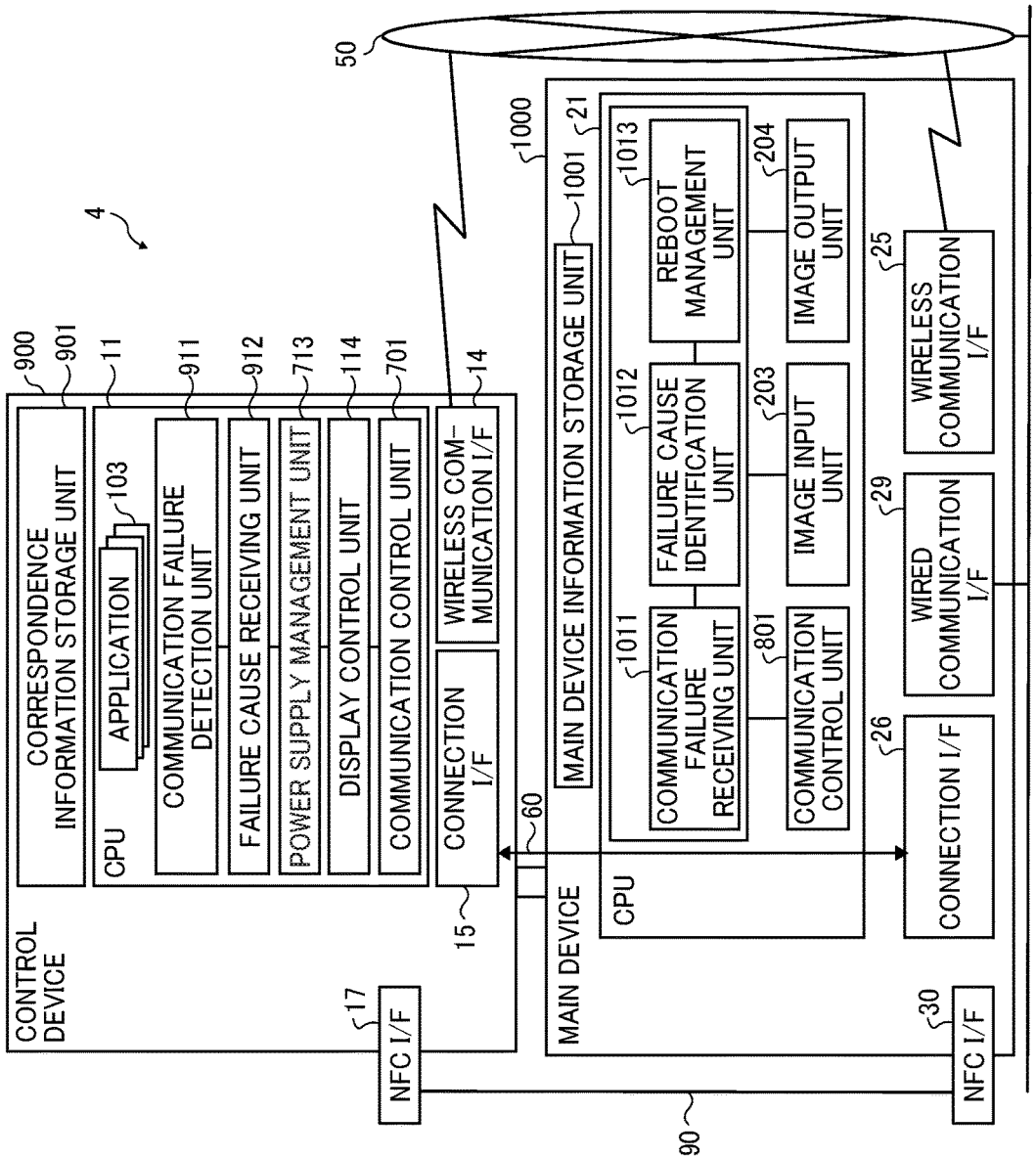
FIG. 15 is a block diagram illustrating a functional configuration of the image forming apparatus according to the fourth embodiment.

FIG. 15 is a block diagram illustrating a functional configuration of the image forming apparatus 4 according to the fourth embodiment. By executing the program read from the ROM 12 onto the RAM 13 with the CPU 11, the control device 900 of FIG. 15 implements a communication control unit 701, a communication failure detection unit 911, a failure cause receiving unit 912, a power supply management unit 713, and a display control unit 114. The CPU 11 also executes an application 103 stored in any desired memory. Additionally, the control device 900 also includes a correspondence information storage unit 901. Functions and configurations of the application 103 and the display control unit 114 are the same as those in the first embodiment and functions and configurations of the communication control unit 701 and the power supply management unit 713 are the same as those in the third embodiment, and the description of those is omitted.

The correspondence information storage unit 901 may be implemented with the ROM 12, and stores correspondence information that includes a type and a version of a device supported by the control device 900 in association with each other. As an example of the correspondence information, table data, Table 1, is given below.

TABLE 1

| Type | Version |
|------|---------|
| AAA | 1.0 |
| BBB | 1.0 |
| BBB | 2.0 |

The communication failure detection unit 911 detects a communication failure occurring in a first communication channel 60, which is for a software communication between the control device 900 and the main device 1000. A method of detecting a communication failure is the same as that in the first embodiment.

When detecting the communication failure in the first communication channel 60, the communication failure detection unit 911 acquires the correspondence information from the correspondence information storage unit 901 and sends a failure notification indicating that the communication failure occurs in the first communication channel 60 and the correspondence information to the main device 1000 through a second communication channel 90 with, for example, an NFC.

After the failure notification in association with the first communication channel 60 is sent to the main device 1000, the failure cause receiving unit 912 receives the failure cause information from the main device 1000 through the second communication channel 90. At this time, when a type and a version of the main device 1000 is not supported by the control device 900 according to the correspondence information, this information is also included in the failure cause information.

A functional configuration of the main device 1000 is described below. Referring to FIG. 15, the main device 1000 includes a communication control unit 801, an image input unit 203, an image output unit 204, a communication failure receiving unit 1011, a failure cause identification unit 1012, and a reboot management unit 1013. The functional units mentioned above of the main device 1000 are implemented by executing a program read from the ROM 22 onto the RAM 23 with the CPU 21. The main device 1000 also includes a main device information storage unit 1001. Functions and configurations of the image input unit 203 and the image output unit 204 are the same as those in the first embodiment and a function and a configuration of the communication control unit 801 is the same as those in the third embodiment, and the description of those is omitted.

The main device information storage unit 1001 may be implemented with the ROM 22 or the HDD 24, and stores main device information that is related to the main device 1000, such as the type and the version of the main device 100. As an example of the main device information, table data, Table 2, is given below.

TABLE 2

| Type | Version |
|------|---------|
| AAA | 1.0 |

When the control device 900 detects the communication failure in the first communication channel 60, the communication failure receiving unit 1011 receives the failure notification and the correspondence information sent from the control device 900 through the second communication channel 90 with the NFC.

The failure cause identification unit 1012 determines and identifies a cause of the communication failure in the first communication channel 60 when receiving the failure notification and the correspondence information from the control device 900. The method of identifying a failure cause includes a method described below, in addition to that in the first embodiment.

When receiving the failure notification and the correspondence information, the failure cause identification unit 1012 acquires the main device information from the main device information storage unit 1001, and determines whether the main device 1000 is supported by the control device 900 according to the received correspondence information and the acquired main device information, thereby identifying the failure cause. That is, when it is determined that the main device 1000 is not supported by the control device 900, the failure cause is the type and the version of the main device 1000, which is not supported by the control device 900 (non-supported type and non-supported version), and when it is determined that the main device 1000 is supported by the control device 900, the failure cause is not the type and the version of the main device 1000.

Subsequently, the failure cause identification unit 1012 sends failure cause information corresponding to the identified failure cause to the control device 700 through the second communication channel 90.

The reboot management unit 1013 sends a shutdown instruction to the control device 900 through the second communication channel 90 with the short-range wireless communication when the failure cause of the communication failure in the first communication channel 60 is the predetermined cause, such as a software error. Subsequently, the reboot management unit 1013 controls the main device 1000 and reboots the main device 1000 when detecting the shutdown of the control device 900.

The reboot management unit 1013 does not send the shutdown instruction nor reboot the main device 1000 when the failure cause is the type and the version of the main device 1000, namely the main device 1000 is non-supported device that is not supported by the control device 900.

Figure 16B:
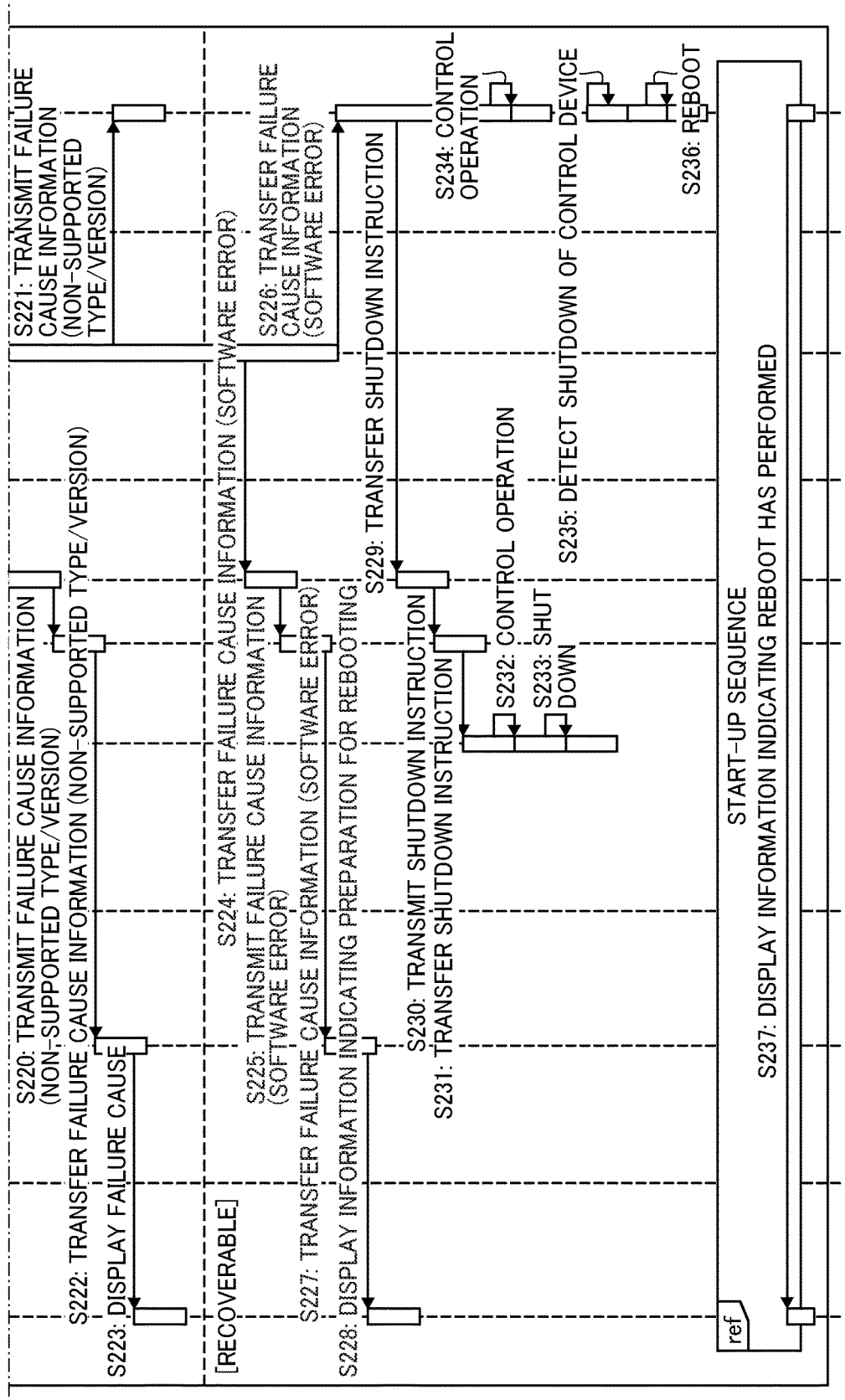

A detailed description of the reboot operation of the image forming apparatus 4 according to the fourth embodiment is given below with reference to FIG. 16. FIG. 16 (FIG. 16A and FIG. 16B) is a sequence diagram illustrating an operation flow of the image forming apparatus 4 performing the reboot operation. In FIG. 16 (FIG. 16A and FIG. 16B), the control device 900 and the main device 1000 communicate to each other via the communication control unit 701 and the communication control unit 801 (see FIG. 15).

The communication failure detection unit 911 of the control device 900 detects a communication failure occurring in the first communication channel 60 (S210), and acquires the correspondence information from the correspondence information storage unit 901 (S211). The display control unit 114 causes the control panel 16 to display information indicating that a cause of the communication failure occurring in the first communication channel 60 is to be identified (S212).

The communication failure detection unit 911, then, transfers to the NFC I/F 17 a failure notification indicating that the communication failure occurs in the first communication channel 60 and the correspondence information (S213), and sends the failure notification and the correspondence information to the main device 1000 from the NFC I/F 17 through the second communication channel 90 (S214).

Subsequently, the NFC I/F 30 of the main device 1000 transfers the failure notification and the correspondence information received from the control device 900 to the communication failure receiving unit 1011 (S215), and the communication failure receiving unit 1011 transfers the failure notification and the correspondence information to the failure cause identification unit 1012 (S216).

When receiving the failure notification and the correspondence information, the failure cause identification unit 1012 acquires the main device information in association with the main device 1000 from the main device information storage unit 1001 (S217). The failure cause identification unit 1012 determines and identifies the failure cause (e.g., hardware error, cable failure, software error, or non-supported device, which is the main device 1000 is not supported by the control device 900) (S218).

The following describes a case where the failure cause causing the communication failure in the first communication channel 60 is that the main device 1000 is non-supported, namely the main device 1000 is not supported by the control device 900.

When the communication failure occurs because, for example, the main device 1000 is not supported by the control device 900, the failure cause identification unit 1012 transmits to the NFC I/F 30 failure cause information indicating that the image forming apparatus 4 is not able to recover by rebooting and the main device 1000 is a non-supported type and version (S219), and the NFC I/F 30 transfers the failure cause information to the control device 900 through the second communication channel 90 with the NFC (S220). The failure cause identification unit 1012 also transfers the failure cause information to the reboot management unit 1013 (S221).

When receiving the failure cause information indicating that the image forming apparatus 4 is not able to recover by rebooting and the failure cause information from the main device 1000, the NFC I/F 17 of the control device 900 transfers the failure cause information to the failure cause receiving unit 912 (S222).

When the failure cause receiving unit 912 transfers the received failure cause information to the display control unit 114, the display control unit 114 causes the control panel 16 to display contents corresponding to the failure cause information (S223) to inform a user thereof. More specifically, the control panel 16 displays a message of error information, for example, "A support condition is not met and the apparatus is not able to recover by rebooting", and this allows the user to cope with the situation smoothly. For example, this allows user who notices the error information to update the type and the version of the main device 1000 to be supported by the control device 900, or a type and a version of the control device 900 to support the main device 1000. Then, the image forming apparatus 4 completes the process without rebooting with the reboot management unit 1013 of the main device 1000.

On the other hand, when the image forming apparatus 4 is able to recover from the communication failure occurring in the first communication channel 60 by rebooting, processing from S224 to S237 is substantially the same as that in the third embodiment (S152 to S165 in FIG. 13 (FIGS. 13A and 13B).

In the processing described above and illustrated in FIG. 16 (FIG. 16A and FIG. 16B), in which the failure cause is identified also by determining whether the main device 1000 is supported by the control device 900, both of the main device 1000 and the control device 900 are assumed to be turned on. The following describes a case where the control device 900 determines a state of the main device 1000 by reading information from an NFC tag even when the main device 1000 of the image forming apparatus 4 is turned off.

More specifically, the reboot management unit 1013 writes to the NFC tag in the NFC I/F 30 processing information that indicates processing previously performed by the main device 1000. The processing information also includes a cause of a failure. The cause of the communication failure included in the processing information is, for example, a cause that causes a failure occurring in the main device 1000 and causes the main device 1000 to shut down urgently. The communication failure detection unit 911 acquires the processing information from the NFC tag if not receiving a shutdown instruction from the main device 1000 after detecting the communication failure. The display control unit 114 informs the user of a state of the image forming apparatus 4 by displaying the acquired information on the control panel 16.

Figure 17:
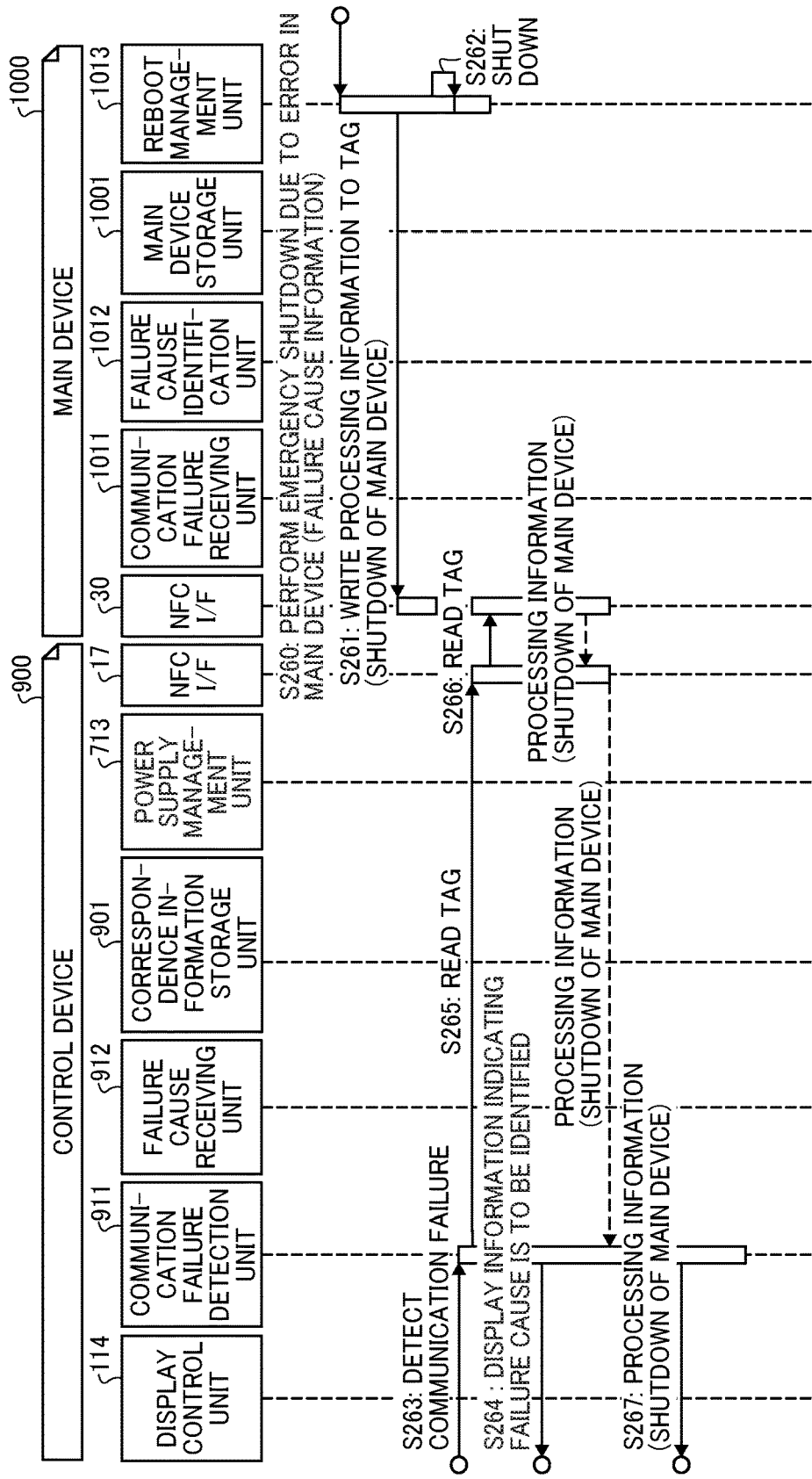
FIG. 17 is a sequence diagram illustrating operation of displaying processing information in the image forming apparatus, according to the fourth embodiment.

FIG. 17 is a sequence diagram illustrating an operation flow of the image forming apparatus 4 in displaying the process information. In FIG. 17, the control device 900 and the main device 1000 communicate to each other via the communication control unit 701 and the communication control unit 801 (see FIG. 15).

When detecting urgent shutdown due to an error occurring in the main device 1000 (S260), the reboot management unit 1013 writes processing information indicating the urgent shutdown of the main device 1000 in the NFC tag of the NFC I/F 30 (S261). The reboot management unit 1013 then shuts down the main device 1000 (S262).

Subsequently, the communication failure detection unit 911 of the control device 900 detects a communication failure in the first communication channel 60 (S263), and the display control unit 114 causes the control panel 16 to display information indicating that a cause of the communication failure occurring in the first communication channel 60 is to be identified (S264).

When the control device 900 detects that the main device 1000 is turned off with, for example, a hardware signal, which is a power supply signal from the main device 1000, the communication failure detection unit 911 reads the NFC tag of the main device 1000 via the NFC I/F 17 and acquires the processing information indicating that the main device 1000 has shut down (S265 and S266).

When the communication failure detection unit 911 transfers the acquired processing information to the display control unit 114, the display control unit 114 causes the control panel 16 to display the processing information (S267). After that, the control device 900 may automatically shut down, or display a dialog to instruct a user to shut down the control device 900.

Another case of the forth embodiment that can be applied is that the main device 1000 is not able to even shut down urgently. For example, to cope with a case where processing of the main device 1000 suddenly stops, the NFC tag is to be updated at the beginning and the end of processing performed by the main device 1000. For example, "Hardware (HW) interrupting" is written to the NFC tag at the beginning of processing of the HW interrupting, and "receiving a result of communication failure determination from control device" is written to the NFC tag at the end of the HW interruption processing. This allows the image forming apparatus 4 to deal with the communication failure occurring in the control device 900 by obtaining the processing information from the NFC tag of the main device 1000. That is, when the control device 900 detects the communication failure while the main device 1000 is turned off, the control device 900 may obtain information such as "HW interrupting" from the NFC tag of the main device 1000.

As described above, in the image forming apparatus 4 according to the fourth embodiment, when the communication failure occurs in the first communication channel 60 transmitting the software signal between the control device 900 and the main device 1000, the failure notification indicating that the communication failure occurs and the correspondence information, which indicates devices that are supported by the control device 900, are sent to the main device 1000 from the control device 900 through the second communication channel 90 with the NFC (short-range wireless communication). The main device 1000 identifies a failure cause of the communication failure and sends failure cause information indicating the failure cause to the control device 900 through the second communication channel 90. At this time, the main device 1000 identifies the failure cause according to the correspondence information and the main device information, which is stored in the main device 1000. When the cause of the communication failure is able to be cleared by rebooting the image forming apparatus 4, the main device 1000 causes the control device 900 to shut down and reboots. On the other hand, when the main device 1000 is a non-supported device, the failure cause is identified as unrecoverable and reboot is not performed. As described above, the image forming apparatus 4 in which the main device 1000 and the control device 900 are provided independently of each other is able to recover from such an abnormal state where the communication failure occurs between the main device 1000 and the control device 900.

Additionally, in the image forming apparatus 4 according to the fourth embodiment, the control device 900 can determine a state of the main device 1000 that is turned off because of an unusual or abnormal event, by acquiring the processing information of the main device 1000 that is written in the NFC tag.

Some embodiments of the disclosure are described above. Numerous additional modifications to the above-described embodiments and variations are possible. It is therefore to be understood that, within the scope of the appended claims, the disclosure of this patent specification may be practiced otherwise than as specifically described herein.

For example, in the embodiments described above, the failure cause identification unit 212 determines and identifies a failure cause from a hardware error, a cable failure, and a software error, but the failure cause is not limited to these. For example, the failure cause identification unit 212 identifies the failure cause as the hardware error or the cable failure. That is, when determining that the hardware error does not occur, the failure cause identification unit does not determine whether the cable failure occurs or not, but determines that the software error causes the communication failure and reboots the image forming apparatus 1. Additionally, when determining that the cable failure does not occur, the failure cause identification unit 212 does not determine whether the hardware error occurs, but determines that the software error causes the communication failure and reboots the image forming apparatus 1. This simplifies the method of identifying a failure cause.

Here in the description above, an external device (auxiliary device) is to include the communication failure detection unit, the failure cause receiving unit, the power supply management unit, the display control unit, and the communication control unit, and the information processing apparatus is to include the communication failure receiving unit, the failure cause identification unit, and the reboot management unit. When the control device 100 is defined as an external device (auxiliary device), the main device 200 is to be defined as an information processing apparatus. However, a combination of the information processing apparatus and the external device (auxiliary device) is not limited to this, and alternatively the control device 100 may be defied as an information processing apparatus, and the main device 200 may be defined as the external device (auxiliary device).

In the embodiment described above, the image forming apparatus 1 is used to describe an information processing apparatus according to one of the embodiments of the disclosure, but this is not a limitation of the disclosure. That is, any information processing apparatus and any information processing system can be used in one of the embodiments as long as the information processing apparatus or the information processing system includes two or more devices independently operating of each other with a corresponding operating system. In the following description, a case where an apparatus that is not an image forming apparatus is used as an information processing apparatus.

Fifth Embodiment

Figure 18:
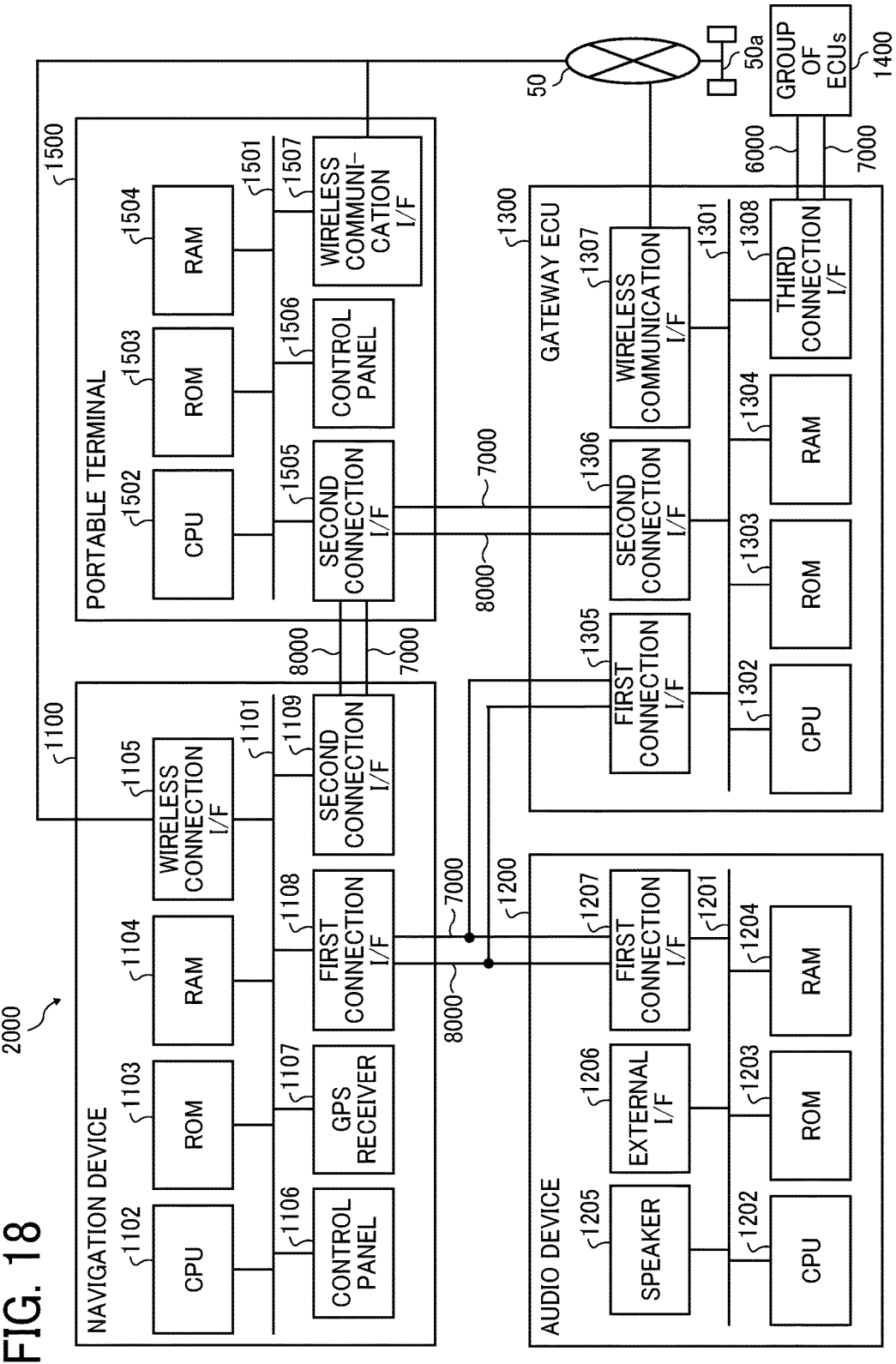
FIG. 18 is a hardware configuration of an in-vehicle device according to a fifth embodiment.

FIG. 18 is a diagram illustrating a hardware configuration of an in-vehicle device 2000 according to a fifth embodiment. An information processing apparatus according to the embodiment corresponds to the in-vehicle device 2000 that is mounted on a vehicle. The vehicle, here, is defined as an automobile that includes drive wheels and an internal combustion engine. As illustrated in FIG. 18, the in-vehicle device 2000 includes a navigation device 1100, an audio device 1200, a gateway electronic control unit (ECU) 1300, and a group of ECUs 1400 connected to the gateway ECU 1300. Additionally, the navigation device 1100 may be connected to a portable terminal 1500 through a first communication channel 8000 and a second communication channel 7000. Additionally, each of the navigation device 1100, the audio device 1200, the gateway ECU 1300, and the portable terminal 1500 operates independently of each other with a corresponding OS.

The navigation device 1100 provides navigation for the vehicle, and, for example, includes a global positioning system (GPS) function and guides a driver for a destination using map data. The navigation device 1100 may be implemented by installing navigation software. Additionally, the navigation device 1100 provides various functions by installing various applications.

The navigation device 1100 receives input according to user operation. The navigation device 1100 is a dedicated device to operate each of the audio device 1200, the gateway ECU 1300, the group of the ECUs 1400, and the portable terminal 1500 and to display information obtained from these devices. The navigation device 1100 according to the embodiment is not limited to such a dedicated device, but may be a smartphone or a tablet terminal belonging to the user.

As illustrated in FIG. 18, the navigation device 1100 includes a CPU 1102, a ROM 1103, a RAM 1104, a wireless communication I/F 1105, a control panel 1106, a GPS receiver 1107, a first connection I/F 1108, and a second connection I/F 1109. The above-mentioned components are connected to each other through an internal bus 1101.

The CPU 1102 controls overall operation of the navigation device 1100. The CPU 1102 executes a program stored in, for example, the ROM 1103 using the RAM 1104 as a work area, and thereby implementing various functions according to the user operation. In addition to the ROM 1103, the navigation device 1100 may include another memory such as a hard disc drive (HDD). The memories, the ROM 1103 and the HDD, may store information, such as map data representing a map, required for guiding the vehicle for a destination, and the CPU 1102 refers the information including the map data.

The wireless communication I/F 1105 is an interface for a wireless connection, and connects the navigation device 1100 to a wireless communication network 50. The wireless communication network 50 is, for example, a wireless LAN.

The first connection I/F 1108 is, for example, a wired interface for a wired connection and communicates with the audio device 1200 and the gateway ECU 1300 through a first communication channel 6000 and the second communication channel 7000. Each of the first communication channel 6000 and the second communication channel 7000 use, for example, an electric connection with, for example, an on-vehicle LAN such as a controller area network (CAN), however, other connection method, such as an Ether communication may be also used.

The first communication channel 6000 transmits a software signal among the navigation device 1100, the audio device 1200, and the gateway ECU 1300. The navigation device 1100, the audio device 1200, and the gateway ECU 1300 usually communicate with each other with a software communication through the first communication channel 6000. The first communication channel 6000 may be used as a wired connection with a signal line, or wireless connection.

The second communication channel 7000 transmits a hardware signal among the navigation device 1100, the audio device 1200, and the gateway ECU 1300. When a communication failure such that the software communication fails to be established through the first communication channel 6000 occurs, the second communication channel 7000 is used for establishing a hardware communication between the navigation device 1100 and the audio device 1200 and/or the navigation device 1100 and the gateway ECU 1300. More specifically, the second communication channel 7000 is used to send a failure notification indicating detection of the communication failure with a hardware signal from the navigation device 1100 to the audio device 1200 or the gateway ECU 1300, or to send, for example, an instruction to turn off the navigation device 1100, with the hardware signal, from the audio device 1200 or the gateway ECU 1300 to the navigation device 1100. However, a communication method of the second communication channel 7000 is not limited to this, and any desired communication method may be applied as long as the second communication channel 7000 and first communication channel 6000 are independent of each other. For example, the second communication channel 7000 may be a signal line that transmits a software signal, or configured with a plurality of signal lines. The second communication channel 7000 may further be configured as a combination of a signal line for transmitting a hardware signal and another signal line for transmitting a software signal. Additionally, the second communication channel 7000 may use a signal line, or wireless communication for the connection.

The second connection I/F 1109 is, for example, a wired interface for a wired connection and communicates with the portable terminal 1500 via the first communication channel 8000 and the second communication channel 7000. As an example of the first communication channel 8000 and the second communication channel 7000, a USB cable may be used, but other connection manner may be also used.

The first communication channel 8000 transmits a software signal between the navigation device 1100 and the portable terminal 1500. The navigation device 1100 and the portable terminal 1500 usually communicate with each other with a software communication through the first communication channel 8000. The first communication channel 8000 may use a signal line, or wireless connection for the communication.

The control panel 1106 includes a touch screen and a hardware key. The touch screen may include, for example, a liquid crystal display (LCD) implementing a touch panel function and an electro luminescence (EL) display device. The control panel 1106 is one example of the display. Additionally, an input device to receive a user input may be provided separately from a display to display information to the user. As such an input device, for example, a keyboard, a mouse, a microphone to receive an audio input and a camera to receive a video image may be provided. The control panel 16 may further be provided with a speaker used to notify the user of a state of the device.

The GPS receiver 1107 receives a GPS signal from a GPS satellite to detect a current position of the vehicle. The GPS receiver 1107 may include a geomagnetic sensor, a distance sensor, a beacon sensor, and a gyro sensor.

The audio device 1200 reproduces audio data transmitted from the portable terminal 1500 via the navigation device 1100 or the gateway ECU 1300, and outputs voice sound informing the user of various information in association with the vehicle, such as a current state of the vehicle.

As illustrated in FIG. 18, the audio device 1200 includes a CPU 1202, a ROM 1203, a RAM 1204, a speaker 1205, an external I/F 1206, and a first connection I/F 1207. The above-mentioned components are connected to each other through an internal bus 1201.

The CPU 1202 controls overall operation of the audio device 1200. The CPU 1202 executes a program stored in, for example, the ROM 1203 using the RAM 1204 as a work area. The CPU 1202, accordingly, implements various functions including an audio function according to user operation and an instruction received.

The first connection I/F 1207 is, for example, an interface for a wired connection, and communicates with the navigation device 1100 and the gateway ECU 1300 through the first communication channel 6000 and the second communication channel 7000.

The external I/F 1206 reads the audio data stored in a recording medium such as a compact disk (CD), a digital versatile disc (DVD, a secure digital (SD) card, or a universal serial bus (USB). The external I/F 1206 may establish a wired or wireless communication to communicate with the portable terminal 1500. The speaker 1205 outputs the audio data obtained with the external I/F 1206 and the information received from the navigation device 1100 or the group of ECUs 1400 via the gateway ECU 1300 as audio sound.

The gateway ECU 1300 adjusts communication among the navigation device 1100, the audio device 1200, and the group of ECUs 1400, which are included in the in-vehicle device 2000.

As illustrated in FIG. 18, the gateway ECU 1300 includes a CPU 1302, a ROM 1303, a RAM 1304, a first connection I/F 1305, a second connection I/F 1306, a wireless communication I/F 1307, and a third connection I/F 1308. The above-mentioned components are connected to each other through an internal bus 1301.

The CPU 1302 controls overall operation of the gateway ECU 1300. The CPU 1302 executes a program stored in, for example, the ROM 1303 using the RAM 1304 as a work area. The CPU 1302, accordingly, implements various functions including a gateway function according to user operation and an instruction received.

The first connection I/F 1305 is, for example, an interface for a wired connection, and communicates with the navigation device 1100 and the audio device 1200 through the first communication channel 6000 and the second communication channel 7000.

The second connection I/F 1306 is, for example, a wired interface for a wired connection and communicates with the portable terminal 1500 via the first communication channel 8000 and the second communication channel 7000. As an example of the first communication channel 8000 and the second communication channel 7000, a USB cable may be used, but other connection manner may be used.

The wireless communication I/F 1307 is an interface for a wireless connection, and connects the gateway ECU 1300 to a wireless communication network 50. The wireless communication network 50 is, for example, a wireless LAN.

The third connection I/F 1308 is, for example, an interface for a wired connection, and communicates with the group of ECU 1400 through the first communication channel 6000 and the second communication channel 7000. In this example, any number of third connections I/F 1308 may be provided according to the group of ECUs 1400.

The group of ECUs 1400 is a group unit of electronic control units that control the vehicle. The group of ECUs 1400 include, for example, an ECU that controls an engine, a steering, and a break, and another ECU that controls a meter and an air conditioner each of which displays each state of the vehicle. The group of ECUs 1400, the navigation device 1100, and the audio device 1200 are electrically connected to each other via the gateway ECU 1300. The group of ECUs 1400 transmits status information of the vehicle to the gateway ECU 1300. The status information includes each state corresponding to a part of the vehicle.

The navigation device 1100 obtains, if necessary, the status information via the gateway ECU 1300, and displays various information based on the status information to assist the driver in driving the vehicle. Additionally, the navigation device 1100 controls each of the ECUs included in the group of ECUs 1400 by transmitting control information to the group of ECUs 1400 via the gateway ECU 1300. The navigation device 1100 is connected to the audio device 1200 without using the gateway ECU 1300 in this embodiment, however, may be connected to the audio device 1200 via the gateway ECU 1300.

The portable terminal 1500 receives an input according to the user operation. The portable terminal 1500 also operates the navigation device 1100, the audio device 1200, and the group of ECUs 1400 via the navigation device 1100 and the gateway ECU 1300. The portable terminal 1500 further displays information obtained from these devices. The portable terminal 1500 includes, for example, a smartphone, a tablet terminal, and a note type personal computer, which belongs to the user.

As illustrated in FIG. 18, the portable terminal 1500 includes a CPU 1502, a ROM 1503, a RAM 1504, a second connection I/F 1505, a control panel 1506, and a wireless communication I/F 1507. The above-mentioned components are connected to each other through an internal bus 1501.

The CPU 1502 controls overall operation of the portable terminal 1500. The CPU 1502 executes a program stored in, for example, the ROM 1503 using the RAM 1504 as a work area, and thereby implementing various functions according to user operation or a user instruction received.

The second connection I/F 1505 is, for example, an interface for a wired connection, and communicates with the navigation device 1100 through the first communication channel 6000 and the second communication channel 7000. The second connection I/F 1505 may communicate with the gateway ECU 1300 via the first communication channel 6000 and the second communication channel 7000.

The control panel 1506 includes a touch screen and a hardware key. The touch screen may include, for example, a liquid crystal display (LCD) implementing a touch panel function and an electro luminescence (EL) display device. The control panel 1506 is one example of the display. Additionally, an input device to receive a user input may be provided separately from a display to display information to the user. As the input device, for example, a keyboard, a mouse, a microphone to receive an audio input and a camera to receive a video image may be provided. The control panel 16 may further be provided with a speaker used to notify the user of a state of the device.

The wireless communication I/F 1507 is an interface for a wireless connection, and connects the portable terminal 1500 to a wireless communication network 50.

In FIG. 18, each of the first communication channel 6000 and the second communication channel 7000 that connect among the navigation device 1100, the audio device 1200, and the gateway ECU 1300 are illustrated as a common signal channel, however the embodiment is not limited to this configuration. For example, each connection between two devices may have a dedicated communication channel in association with each of the first communication channel 6000 and the second communication channel 7000. That is, the first communication channel 6000 and the second communication channel 7000 that connect between the navigation device 1100 and the audio device 1200 are respectively independent of the first communication channel 6000 and the second communication channel 7000 that connect between the navigation device 1100 and the gateway ECU 1300. Furthermore, the second communication channel 7000 may be provided for a part of the connections between two devices.

Figure 19:
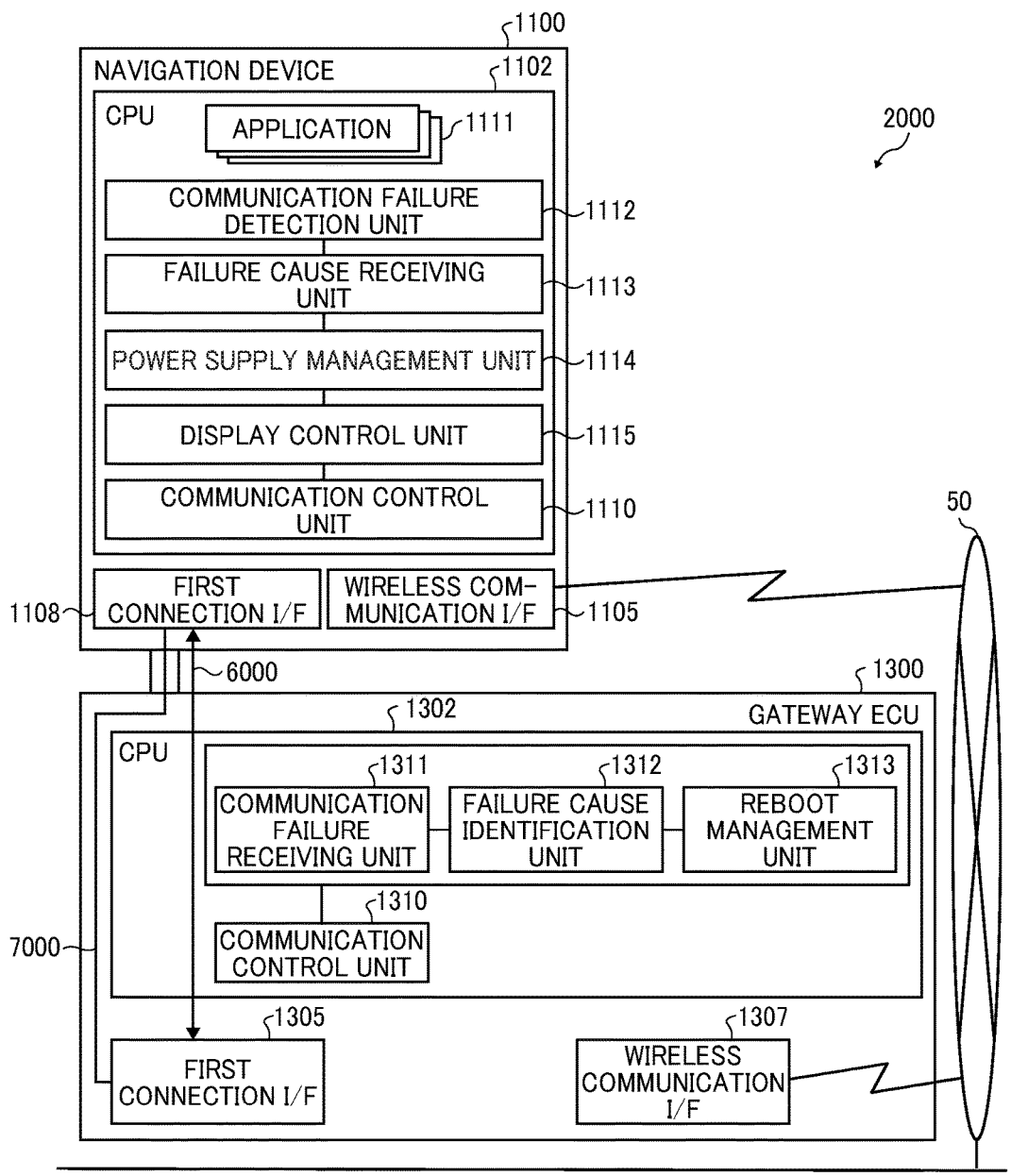
FIG. 19 is a block diagram illustrating a functional configuration of the in-vehicle device according to the fifth embodiment.

FIG. 19 is a block diagram illustrating a functional configuration of the in-vehicle device 2000 according to the fifth embodiment. In the following description, the navigation device 1100 is used as one example of an external device (auxiliary device) external to the gateway ECU 1300, and the gateway ECU 1300 is used as one example of the information processing apparatus. The navigation device 1100 illustrated in FIG. 19 implements a communication control unit 1110, a communication failure detection unit 1112, a failure cause receiving unit 1113, a power supply management unit 1114, and a display control unit 1115 by executing a program read from the ROM 1103 onto the RAM 1104 with the CPU 1120. The CPU 1120 also executes an application 1111 stored in any desired memory. Additionally, these functional units may be implemented with a plurality of hardware devices including a plurality of CPUs and memories such as ROMs and RAMs, by operating in conjunction with each other.

The communication control unit 1110 sends to and receives from other devices, including the audio device

1200, information via the first connection I/F 1108 and the wireless communication I/F 1105.

The application 1111 includes a user interface to display a screen on the control panel 1106 and receives operation settings from the user via the control panel 1106. The application 1111 may provide a service using a car navigation function and a service using an audio reproducing function included in the audio device 1200. Additionally, there may be a plurality of applications 1111, and, for example, one of the plurality of the applications 1111 may be used with the control panel 1106, and others may be used with the audio device 1200, the gateway ECU 1300, and the group of ECUs 1400. Furthermore, another one of the plurality of applications 1111 may be used with one or more of the control panel 1106 and each of the audio device 1200, the gateway ECU 1300, and the group of ECUs 1400.

For example, as the application 1111, the navigation device 1100 is installed with various application programs, which is software, such as a current position calculation program and a map search program, and detect a current position of the vehicle and inform the user of the current position detected, for example. Additionally, the application 1111 refers information obtained from each of the audio device 1200, the gateway ECU 1300, the portable terminal 1500, the group of ECUs 1400 and the like.

The communication failure detection unit 1112 detects a communication failure occurring in the first communication channel 6000, which is used for a software communication established between the navigation device 1100 and the gateway ECU 1300. For example, the communication failure detection unit 1112 determines that the communication failure occurs, when the communication control unit 1110 has not received a signal for a predetermined time since the last time a signal was received, or when a predetermined time has passed without receiving a signal since the communication control unit 1110 sent a predetermined signal. Here, the predetermined time and the predetermined signal are, for example, determined according to a standard of the second communication channel 7000 or set by a designer according to, for example, the empirical data or preferences. However, the methods for detecting the communication failure are not limited to the method mentioned above.

When detecting the communication failure in the first communication channel 6000, the communication failure detection unit 1112 sends a failure notification that indicates that the communication failure occurs in the first communication channel 6000 to the gateway ECU 1300 with a hardware signal through the second communication channel 7000.

After the failure notification, which indicate a failure occurs in the first communication channel 6000, is transmitted to the gateway ECU 1300, the failure cause receiving unit 1113 receives failure cause information that indicates a cause of the communication failure or a determination result indicating whether or not to reboot the gateway ECU 1300 from the gateway ECU 1300 through the second communication channel 7000.

The power supply management unit 1114 manages the power supply of the navigation device 1100. The power supply management unit 1114 also receives, from the gateway ECU 1300 through the second communication channel 7000, a shutdown instruction that instructs to shut down when the failure cause is a predetermined cause that is possible to be cleared to recover the gateway ECU 1300 from the failure occurring in the communication channel 6000 by rebooting, or when the determination result indicates to reboot the gateway ECU 1300. When receiving the shutdown instruction, the power supply management unit 1114 shuts down the navigation device 1100. At this time, the power supply management unit 1114 may stop all programs operating in the navigation device 1100 to completely turn off the power source, or may save a current operational state and remain power supply to some of the components in the navigation device 1100 so that the navigation device 1100 starts at high speed next time. Additionally, the gateway ECU 1300 may use a signal line that transmits a software signal selected from the multiple signals configuring the second communication channel 7000 when sending the shutdown instruction to the navigation device 1100. The predetermined cause mentioned above is a cause of a failure that occurs in the first communication channel 6000, and is possible to be solved to recover the gateway ECU 1300 by rebooting the gateway ECU 1300, and such a predetermined cause includes, for example, a software error.

The display control unit 1115 displays various information on the control panel 1106 (display) to inform the user of the information. In this embodiment, the display control unit 1115 displays on the control panel 1106 the failure cause causing the communication failure in the first communication channel 6000 or the determination result indicating whether or not to reboot the gateway ECU 1300, each of which is received from the gateway ECU 1300. The display control unit 1115 causes the control panel 1106 to display information indicating that the gateway ECU 1300 is preparing for rebooting when the failure cause in association with the first communication channel 6000 is the predetermined cause (software error), which is possible to be solved and the gateway ECU 1300 is able to recover by rebooting, or when the determination result indicates to reboot the gateway ECU 1300. The display control unit 1115 further displays, on the control panel 1106, information indicating that the gateway ECU 1300 has rebooted when the gateway ECU 1300 has rebooted.

The following description is regarding the gateway ECU 1300. By executing a program read from the ROM 1303 onto the RAM 1304 with the CPU 1302, the gateway ECU 1300 of FIG. 19 implements a communication control unit 1310, a communication failure receiving unit 1311, a failure cause identification unit 1312, and a reboot management unit 1313. Alternatively, the functional units may be implemented with a plurality of hardware devices including a plurality of CPUs and memories such as ROMs and RAMs, by operating in conjunction with each other.

The communication control unit 1310 transmits to and receives from other devices, including the navigation device 1100, information via the first connection I/F 1305.

When the navigation device 1100 detects a communication failure in the first communication channel 6000, the communication failure receiving unit 1311 receives a failure notification sent from the navigation device 1100 with a hardware signal via the second communication channel 7000. The communication failure receiving unit 1311 may detect the communication failure in the first communication channel 6000. In this case, in which the communication failure receiving unit 1311 detects the communication failure, the communication failure receiving unit 1311 determines that the communication failure occurs, for example, when the communication control unit 1310 has not received a signal for the predetermined time since the last time a signal was received, or when the predetermined time has passed without receiving a signal since the communication control unit 1310 sent a predetermined signal. However, the methods for detecting the communication failure are not limited to the method mentioned above.

The failure cause identification unit 1312 determines and identifies a cause of the communication failure in the first communication channel 6000 when receiving the failure notification from the navigation device 1100 or when the communication failure receiving unit 1311 detects an occurrence of the communication failure in the first communication channel 6000. Here in the embodiment, as examples of the cause of the communication failure in the first communication channel 6000, a hardware error, a cable failure, and a software error are described. When the failure cause is a hardware error or a cable failure, the failure cause identification unit 1312 determines not to reboot the gateway ECU 1300 because the hardware error and the cable failure is impossible to be corrected by rebooting the gateway ECU 1300. On the other hand, when the cause of failure is a software error, the failure cause identification unit 1312 determines to reboot the gateway ECU 1300 because the communication failure is possible to be corrected by rebooting the gateway ECU 1300. That is, the failure cause identification unit 1312 determines whether or not to reboot the gateway ECU 1300 according to the failure cause.

The following describes example methods for identifying a cause of failure, which occurs in the first communication channel 6000. For example, the failure cause identification unit 1312 checks whether there is a defect in a non-volatile area that stores a basic input/output system (BIOS). When the BIOS starts up normally, a light emitting diode (LED) of the gateway ECU 1300 flashes. The failure cause identification unit 1312 checks a state of the LED, namely if the LED is flashing, to determine whether the non-volatile has a defect. When the LED is not flashing, the failure cause identification unit 1312 determines that the failure cause is a defect of the non-volatile area and identifies the hardware error as the failure cause.

Additionally, for example, the failure cause identification unit 1312 checks a connection state of the first connection I/F 1305, which is a signal line, and determines whether there is a connection device connected to. When there is no connection device being connected to, the failure cause identification unit 1312 identifies the cable failure as the failure cause.

Additionally, for example, the failure cause identification unit 1312 identifies the software error as the failure cause when determining the failure cause is not a hardware-related failure cause, for example, the hardware error and the cable failure. Such settings is set by a designer in designing the system, the service provider providing the services, etc. Alternatively, the user may set or modify such settings.

The failure cause identification unit 1312 sends the identified failure cause of the communication failure in the first communication channel 6000, namely failure cause information, to the navigation device 1100 through the second communication channel 7000. Alternatively, the failure cause identification unit 1312 may send a determination result indicating whether or not to reboot the gateway ECU 1300 instead of sending failure cause information to the navigation device 1100 using the second communication channel 7000.

The reboot management unit 1313 sends to the navigation device 1100 a shutdown instruction with a hardware signal through the second communication channel 7000 when the failure cause of the communication failure in the first communication channel 6000 is the predetermined cause, such as a software error. Subsequently, the reboot management unit 1313 controls the gateway ECU 1300 and reboots the gateway ECU 1300 when detecting the shutdown of the navigation device 1100. That is, when the failure cause identification unit 1312 determines to reboot the gateway ECU 1300, the reboot management unit 1313 transmits the shutdown instruction to the navigation device 1100 through the second communication channel 7000 and then reboots the gateway ECU 1300. At this time, the reboot management unit 1313 may restart after deactivating all programs being activated in the gateway ECU 1300 and stopping the power supply to all components in the gateway ECU 1300. Alternatively, the reboot management unit 1313 may reboot while remaining the power supply to some of the components in the gateway ECU 1300, or may reboot after deactivating a part or all of the software being activated in the gateway ECU 1300.

When a plurality of devices are connected to the gateway ECU 1300 through the first communication channel 6000 and the second communication channel 7000 as external devices (auxiliary devices), the failure cause identification unit 1312 may identifies a failure cause by checking each of the devices in order, or checking all of the devices at once.

The processing of the navigation device 1100 and the gateway ECU 1300 in the in-vehicle device 2000 according to the fifth embodiment is substantially the same as that of the control device 100 and the main device 200 according to the first embodiment. Additionally the in-vehicle device 2000 according to the fifth embodiment may combine with other embodiments. For example, the in-vehicle device 2000 may include a microcomputer between the navigation device 1100 and the gateway ECU 1300 as described in the second embodiment, and thereby providing substantially the same effect as the second embodiment. Additionally, the in-vehicle device 2000 may include an NFC I/F in each of the navigation device 1100 and the gateway ECU 1300 as described in the third embodiment and the fourth embodiment, and thereby providing substantially the same effect as the third embodiment and the fourth embodiment.

Here in the description above, an external device (auxiliary device) is to include the communication control unit 1110, the communication failure detection unit 1112, the failure cause receiving unit 1113, the power supply management unit 1114, and the display control unit 1115, and an information processing apparatus is to include the communication control unit 1310, the communication failure receiving unit 1311, the failure cause identification unit 1312, and the reboot management unit 1313. When the navigation device 1100 is defined as an external device (auxiliary device) with this configuration, the gateway ECU 1300, the audio device 1200, and the portable terminal 1500 may be defined as information processing apparatuses. Alternatively, when the portable terminal 1500 is defined as an external device (auxiliary device), the navigation device 1100 and the gateway ECU 1300 may be defined as information processing apparatuses. Additionally, when one of the ECUs included in the group of the ECUs 1400 is defined as an external device (auxiliary device), the gateway ECU 1300 may be defined as an information processing apparatus. However, combinations of the information processing apparatus and the external device (auxiliary device) is not limited these mentioned above.

Additionally, the in-vehicle device 2000 according to this embodiment is described to include the navigation device 1100, the audio device 1200, the gateway ECU 1300, the group of the ECUs 1400, however the configuration of the in-vehicle device 2000 according to the embodiment is not limited to this. For example, the navigation device 1100 may integrally include the audio device 1200, or has a part of function of the gateway ECU 1300. Furthermore, the in-vehicle device 2000 may include other devices, which are connected to the navigation device 1100, such as a reproducing device for reproducing video image stored in a DVD or a Video, a communication device for accessing the Internet, another communication device for establishing communication with other communication facilities outside of the vehicle, including other vehicle, a road-side infrastructure, and management center. In this case, any one of the above-mentioned devices may be one of an external device (auxiliary device) and an information processing apparatus.

Sixth Embodiment

Embodiments of the disclosure also can be applied to household appliances. The household appliances include, for example, refrigerators, air conditioners, washing machines, microwaves, and televisions.

To describe a hardware configuration of the household appliance according to the sixth embodiment, FIG. 1, which is used to describe the hardware configuration of the image forming apparatus 1 according to the first embodiment, is used and referred. The hardware configuration of the household appliance according to the sixth embodiment is described below with reference to FIG. 1. The household appliance includes a control device 100, which is one example of an external device (auxiliary device) external to a main device 200, and the main device 200, which is one example of the information processing apparatus. Depending on a type of the household appliance, the engine 27 is replaced with a dedicated device capable of performing processing dedicated to the specific type of the household appliance.

For example, when the household appliance is a refrigerator, the dedicated device implements a cooling function to cool inside of a storage chamber, and includes, for example, a compactor, a blowing fan, and a damper. Alternatively, when the household appliance is an air conditioner, the engine 27 implements an air conditioning function for adjusting temperature and humidity in a room so that values of the temperature and humidity are close to target values, and includes, for example, a compactor, a heat exchanger, and a blowing fan. Alternatively, when the household appliance is a washing machine, the engine 27 implements a washing function, such as washing and rinsing, and includes, for example, a rotating drum and a motor. Alternatively, when the household appliance is a microwave, the engine 27 implements a heating function for heating a target object, and includes, for example, a magnetron, a cooling fan, and a motor. Alternatively, when the household appliance is a television, the engine 27 implements a function for outputting a video image and an audio sound received from the external, and includes, for example, a tuner, a demodulator, a display, and a speaker.

To describe a functional configuration of the household appliance according to the sixth embodiment, FIG. 2, which is used to describe the functional configuration of the image forming apparatus 1 according to the first embodiment, is used and referred. The control device 100 provided for the household appliance according to the embodiment implements a communication control unit 101, an application 103, a communication failure detection unit 111, a failure cause receiving unit 112, a power supply management unit 113, and a display control unit 114 by executing a program read from the ROM 12 onto the RAM 13 with the CPU 11. By executing a program read from the ROM 22 onto the RAM 23 with the CPU 21, the main device 200 provided for the household appliance implements a communication control unit 201, a communication failure receiving unit 211, a failure cause identification unit 212, and a reboot management unit 213. Functions and processing implemented and performed with each block are the same as that in the first embodiment and the description thereof is omitted. The household appliance according to the sixth embodiment can be combined with one or more of the embodiments. For example, similar to the second embodiment, providing a microcomputer between the control device 100 and the main device 200 provides the same effect that is described in the second embodiment. Alternatively, similar to the third embodiment and the fourth embodiment, providing an NFC I/F between the control device 100 and the main device 200 provides the same effect as that in the third and fourth embodiments.

This embodiment is not limited above-mentioned examples, but can be applied to any desired household appliances, such as an electric rice-cooker, a digital versatile disc (DVD), audio equipment, and electric photo frame.

Each program executed in the information processing apparatus according to each embodiment may be provided by being installed in a ROM or the like in advance. Alternatively, each program executed in the information processing apparatus according to each embodiment may be stored in a computer readable, recording medium, such as a compact disc read only memory (CD-ROM), a flexible disk (FD), a compact disc recordable (CD-R), and a digital versatile disk (DVD), in a file format installable or executable.

Furthermore, the program executed in the information processing apparatus according to each embodiment may be stored in a computer connected to a network such as the Internet and provided by downloading via the network. Alternatively, the program executed in the information processing apparatus according to each embodiment may be provided or distributed via a network such as the Internet.

The program executed in the information processing apparatus according to each program has a module configuration including each components described above, the communication control unit, the image input unit, the image output unit, the communication failure receiving unit, the failure cause identification unit, the reboot management unit. As an actual hardware configuration, the CPU (processor) reads and executes the program from the ROM and executed to load each component described above into the main memory to implement the each component. Alternatively, a part of these functions of the components described above may be implemented by a dedicated hardware circuit.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing apparatus, comprising:
an interface configured to communicate with an auxiliary device via a first communication channel and a second communication channel, the first communication channel and the second communication channel each being configured to separately exchange communications between the information processing apparatus and the auxiliary device; and
circuitry configured to,
obtain failure information indicating a communication failure occurring in the first communication channel,
send a shutdown instruction via the second communication channel in response to a determination that the communication failure in the first communication channel is correctable by rebooting the information processing apparatus, the shutdown instruction instructing the auxiliary device to shut down, and
reboot the information processing apparatus after sending the shutdown instruction such that, in response to the determination that the communication failure in the first communication channel is correctable, the information processing apparatus corrects the communication failure in the first communication channel by instructing the auxiliary device to shut down via the second communication channel, and subsequently performing a self-reboot operation to reboot the information processing apparatus.

2. The information processing apparatus of claim 1, wherein the circuitry is configured to determine whether to reboot the information processing apparatus to recover from the communication failure.

3. The information processing apparatus of claim 1, wherein the circuitry is configured to obtain the failure information from the auxiliary device via the second communication channel.

4. The information processing apparatus of claim 3, wherein the circuitry is configured to,
determine an amount of time since a last reboot of the information processing apparatus; and
send the shutdown instruction to the auxiliary device and reboot the information processing apparatus only in response to the amount of time since the last reboot being greater than or equal to a set time period.

5. The information processing apparatus of claim 3, further comprising:
a memory configured to store apparatus information associated with the information processing apparatus, and wherein,
in response to the circuitry obtaining the failure information indicating the communication failure occurring in the first communication channel, the circuitry is further configured to,
obtain supported apparatus information from the auxiliary device via the second communication channel, the supported apparatus information indicating at least one apparatus that is supported by the auxiliary device,
determine whether the information processing apparatus is supported by the auxiliary device based on the supported apparatus information and the apparatus information, and
suspend transmission of the shutdown instruction to the auxiliary device and rebooting of the information processing apparatus, in response to determining that the information processing apparatus is not supported by the auxiliary device.

6. The information processing apparatus of claim 5, wherein
the supported apparatus information includes an apparatus type of the at least one apparatus supported by the auxiliary device and a version of software associated with the at least one apparatus supported by the auxiliary device, and
the apparatus information stored in the memory includes an apparatus type of the information processing apparatus and a version of software associated with the information processing apparatus.

7. The information processing apparatus of claim 1, wherein the circuitry is configured to,
send a determination result to the auxiliary device via the second communication channel, the determination result indicating whether the circuitry has determined to reboot the information processing apparatus.

8. The information processing apparatus of claim 1, wherein the information processing apparatus is configured to utilize the second communication channel to communicate at least a hardware signal between the information processing apparatus and the auxiliary device.

9. The information processing apparatus of claim 1, wherein the second communication channel is a short-range wireless communication channel between the information processing apparatus and the auxiliary device.

10. The information processing apparatus of claim 1, wherein the circuitry is configured to,
determine a cause of the communication failure occurring in the first communication channel,
determine to reboot the information processing apparatus in response to determining that the cause of the communication failure occurring in the first communication channel is a software error, and
determine not to reboot the information processing apparatus in response to determining that the cause of the communication failure occurring in the first communication channel is not the software error.

11. The information processing apparatus of claim 1, wherein
the first communication channel includes a signal line to transmit one or more signals, and
the circuitry is configured to,
check a connection state of the signal line when receiving the failure information,
determine to reboot the information processing apparatus in response to the connection state indicating that the signal line is operational, and
determine not to reboot the information processing apparatus in response to the connection state indicating that the signal line is not operational.

12. The information processing apparatus of claim 1, wherein the shutdown instruction transmitted via the second communication channel instructs the auxiliary device to shut down, if the auxiliary device receives the shutdown instruction within a set time period after receipt of a determination result indicating that the communication failure in the first communication channel is correctable by rebooting the information processing apparatus.

13. A system comprising:
an information processing apparatus; and
an auxiliary device;
the information processing apparatus including,
an interface configured to communicate with the auxiliary device via a first communication channel and a second communication channel, the first communication channel and the second communication channel each being configured to separately exchange communications between the information processing apparatus and the auxiliary device, and circuitry configured to, obtain failure information indicating a communication failure occurring in the first communication channel, determine whether the communication failure in the first communication channel is correctable, send a determination result indicating whether to reboot the information processing apparatus to the auxiliary device, send a shutdown instruction via the second communication channel in response to the circuitry determining that the communication failure in the first communication channel is correctable, the shutdown instruction instructing the auxiliary device to shutdown, and reboot the information processing apparatus after sending the shutdown instruction such that, in response to determining that the communication failure in the first communication channel is correctable, the information processing apparatus corrects the communication failure in the first communication channel by instructing the auxiliary device to shut down via the second communication channel, and subsequently performing a self-reboot operation to reboot the information processing apparatus.

14. The system of claim 13, wherein the auxiliary device includes, a display; and auxiliary circuitry configured to, shut down the auxiliary device in response to receipt of the shutdown instruction via the second communication channel, within a set time period after receipt of the determination result indicating to reboot the information processing apparatus; and control the display to display condition information in response to the auxiliary device not receiving the shutdown instruction within the set time period, the condition information indicating that conditions for rebooting the information processing apparatus are not met.

15. The system of claim 14, wherein the second communication channel is a short-range wireless communication channel between the information processing apparatus and the auxiliary device, the information processing apparatus further includes an additional interface configured to communicate via a short-range wireless communication protocol via the second communication channel, and the circuitry is configured to transmit processing information indicating processing performed by the information processing apparatus in a tag of the additional interface.

16. The system of claim 15, wherein the auxiliary circuitry of the auxiliary device is configured to extract the processing information from the tag in response to the auxiliary device not receiving the shutdown instruction within the set time period.

17. The system of claim 16, wherein the tag is a near field communication tag, and the processing information included in the tag indicates a cause of a failure occurring in the information processing apparatus.

18. The system of claim 13, further comprising:

a management device including management circuitry, the management device connected to the second communication channel between the information processing apparatus and the auxiliary device, such that the second communication channel is configured to communicate one or more signals between the information processing apparatus and the auxiliary device via the management device, the management circuitry being configured to, send the failure information received from the auxiliary device to the information processing apparatus via the second communication channel; and send the determination result received from the information processing apparatus to the auxiliary device via the second communication channel.

19. The system of claim 18, wherein the management circuitry is configured to, determine whether the determination result is received by the auxiliary device within a set time period after the management device sends the failure information to the information processing apparatus, and in response to the determination result not being received by the auxiliary device within the set time period, transmit a shutdown instruction to the auxiliary device via the second communication channel; and instruct the information processing apparatus to reboot.

20. An auxiliary device comprising:

an interface configured to communicate with an information processing apparatus via a first communication channel and a second communication channel, the first communication channel and the second communication channel each configured to separately exchange communications between the auxiliary device and the information processing apparatus, a display configured to display information to a user;

a circuitry configured to, shut down the auxiliary device in response to receipt of a shutdown instruction from the information processing apparatus via the second communication channel within a set time period after receipt of a determination result indicating that a communication failure in the first communication channel is correctable by rebooting the information processing apparatus, and control the display to display condition information in response to the auxiliary device not receiving the shutdown instruction within the set time period, the condition information indicating that conditions for rebooting the information processing apparatus are not met.

* * * * *